United States Patent
Yamagata et al.

(10) Patent No.: US 7,188,777 B2
(45) Date of Patent: Mar. 13, 2007

(54) IC CARD, INFORMATION PROCESSING TERMINAL, TRILATERAL DATA COMMUNICATION SYSTEM, AND METHOD

(75) Inventors: Akihiko Yamagata, Kanagawa (JP); Akira Fukada, Tokyo (JP)

(73) Assignee: Sony Corporation (JP)

( * ) Notice: Subject to any disclaimer, the term of this patent is extended or adjusted under 35 U.S.C. 154(b) by 524 days.

(21) Appl. No.: 10/433,790

(22) PCT Filed: Oct. 29, 2002

(86) PCT No.: PCT/JP02/11195

§ 371 (c)(1),
(2), (4) Date: Jun. 6, 2003

(87) PCT Pub. No.: WO03/038744

PCT Pub. Date: May 8, 2003

(65) Prior Publication Data
US 2004/0110533 A1 Jun. 10, 2004

(30) Foreign Application Priority Data
Oct. 31, 2001 (JP) ............................. 2001-334966
Oct. 1, 2002 (JP) ............................. 2002-288744

(51) Int. Cl.
*G06K 19/06* (2006.01)
(52) U.S. Cl. ...................... 235/492; 235/476; 235/451; 235/441
(58) Field of Classification Search ................. 235/492, 235/476
See application file for complete search history.

(56) References Cited

U.S. PATENT DOCUMENTS 5,541,985 A 7/1996 Ishii et al.
5,929,414 A 7/1999 Saitoh (Continued)

FOREIGN PATENT DOCUMENTS

EP 0 945 828 9/1999
JP 6-162279 A1 6/1994

(Continued)

OTHER PUBLICATIONS

EPO Supplemental Search Report dated Jul. 8, 2005.
International Search Report and Examination Report Mar. 4, 2003.

(Continued)

*Primary Examiner*—Seung H Lee
(74) *Attorney, Agent, or Firm*—Rader, Fishman & Grauer PLLC; Ronald P. Kananen

(57) ABSTRACT

An IC card transmits data received from a card reading and writing apparatus to a portable terminal via an external interface without changing the received data, or after the received data is converted according to an appropriate conversion scheme or is converted into other packet data. Conversely, the IC card transmits data received from the portable terminal via the external interface to the card reading and writing apparatus via a non-contact interface without changing the received data, or after the received data is converted according to an appropriate conversion scheme or is converted into other packet data. Therefore, non-contact data communication can be performed between the information processing terminal connected to the IC card and the card reading and writing apparatus.

23 Claims, 12 Drawing Sheets

U.S. PATENT DOCUMENTS

| | | | |
|---|---|---|---|
| 6,011,323 A * | 1/2000 | Camp .......................... 307/64 |
| 6,045,043 A | 4/2000 | Bashan et al. |
| 6,168,083 B1 | 1/2001 | Berger et al. |
| 6,199,763 B1 | 3/2001 | Thuringer et al. |
| 6,389,486 B1 * | 5/2002 | Petty ............................ 710/8 |
| 6,601,770 B1 * | 8/2003 | Ikefuji et al. ................ 235/492 |
| 6,668,159 B1 * | 12/2003 | Olofsson et al. ......... 455/226.1 |

FOREIGN PATENT DOCUMENTS

| | | |
|---|---|---|
| JP | 10-191454 A1 | 7/1998 |
| JP | 2000-341763 A1 | 12/2000 |
| JP | 2001-250094 A1 | 9/2001 |
| JP | 2001-273528 A1 | 10/2001 |
| JP | 2001-297198 A1 | 10/2001 |

* cited by examiner

IC CARD, INFORMATION PROCESSING TERMINAL, TRILATERAL DATA COMMUNICATION SYSTEM, AND METHOD

TECHNICAL FIELD

The present invention relates to a non-contact IC card or IC chip which has a memory function for storing data and which is configured such that data can be read from and written to the memory in a non-contact manner. More particularly, the present invention relates to a non-contact IC card or IC chip including a wireless interface for wireless data access to the memory function from an external reader/writer and a wired interface for connection with an external device, and relates to an information processing terminal such as a cellular telephone, a PDA, or a personal computer connected to such an IC card via a wired interface or incorporating such an IC chip when used.

The present invention further relates to a three-way communication system and method with an IC card or IC chip intermediate between a reading and writing apparatus for reading and writing data from and to the IC card or IC chip and an information processing terminal connected to such an IC card via a wired interface or incorporating such an IC chip when used. More particularly, the present invention relates to a three-way communication system and method which makes use of an IC module having integration of a reading and writing apparatus which sends an electromagnetic-wave query signal and an IC card which varies the load across an antenna thereof according to a response signal to the query signal so that a signal that appears in a receiving circuit of the reading and writing apparatus is amplitude-modulated for communication, the IC module being initiated as an IC card by electromagnetic wave detection and as a reading and writing apparatus by a normal power-on operation.

BACKGROUND ART

Hitherto, a variety of apparatuses using a secret personal number or a password for personal identity verification or authentication have been devised and put into practice. In banks or other financial institutions, for example, for using cash cards or credit cards, cash dispensers or other banking terminals prompt users to enter a secret personal number or a password for personal identity authentication, and cash cannot be deposited or withdrawn until it has been confirmed that the correct secret personal number or password was entered by the user.

A storage medium such as a magnetic stripe placed on one cash card has only a single storage area for only the corresponding bank. The above-noted secret personal number or password entry merely allows access to the single storage area, and may be insufficient for protection against forgery or theft.

For anti-forgery purposes, the cash card or credit card is often implemented as a contact IC card having an electric contact or a non-contact IC card for reading and writing data in a non-contact manner via wireless data communication. IC card readers/writers installed in, for example, cash dispensers, at the entrances of concert halls, on station ticket gates, and so on are able to access IC cards passed thereover by users in a non-contact manner.

A user enters a secret personal number to the reader of an IC card reader/writer to verify the entered secret personal number against a secret personal number stored in the IC card, thus realizing personal identity verification or authentication between the IC card and the IC card reader/writer. When personal identity verification or authentication is successfully performed, for example, an application stored in the IC card can be used. The applications stored in an IC card may include, for example, that for amount information such as electronic money and electronic ticketing. (A secret personal number for use in accessing an IC card is referred to as PIN (Personal Identification Number).)

Recently, with the development of nanotechnology, IC cards having a relatively large capacity of storage space have become commercially available and have become increasingly widespread. Since a traditional cash card has only a single storage area, i.e., a single application, carried therein, it is necessary to carry a plurality of cards for various uses or applications. On the other hand, the above-noted IC card having a large capacity memory can concurrently store a plurality of applications, and, therefore, a single IC card can be used for a plurality of applications. For example, more than one application used for electronic money for electronic payment, electronic tickets for admission to designated concert halls, and so on can be stored on a single IC card so as to use the single IC card in various applications.

An IC card includes not only a non-contact interface with a card reader/writer (card reading and writing apparatus) but also an external wired interface for connecting to an external device, and the IC card can be connected to or installed in an information processing terminal such as a cellular telephone, a PDA (Personal Digital Assistant), or a personal computer when used. (In many cases where the IC card is installed in the terminal, the IC card is formed into one chip. The IC card and IC chip are hereinafter collectively referred to simply as an "IC card".)

In such a case, a variety of application services using the IC card can be performed on the information processing terminal. For example, a user interface such as a keyboard or a display on the information processing terminal can be used for user interaction with the IC card on the information processing terminal. If the IC card is connected to a cellular telephone, the content stored on the IC card can be exchanged over a telephone line.

It is often advantageous if the IC card has two types of interfaces, i.e., the non-contact interface and the external wired interface. For example, an information processing terminal connected to the external wired interface can perform non-contact data communication with a card reading and writing apparatus via the IC card.

Since non-contact data communication requires no manual operation such as connection of connectors, mechanical damage to the parts, such as broken or worn connector pins due to repeated attachment and detachment operations, does not occur.

As an example, it is assumed that a user carries a portable terminal with a built-in IC card, and a public terminal for distributing music or image content or game programs incorporates a card reading and writing apparatus. Once the user passes the portable terminal over the card reading and writing apparatus of the public terminal, non-contact data communication is initiated between the card reading and writing apparatus and the portable terminal to download the desired content or programs into the portable terminal.

However, there is no mechanism for performing data communication between the information processing terminal connected to the IC card and the card reading and writing apparatus.

Recent advances in the packaging technology have allowed an IC card function and a card reading and writing apparatus to be integrated into a single semiconductor chip.

Such an IC chip is initiated as an IC card by electromagnetic wave detection and as a reading and writing apparatus by a normal power-on operation.

There is also no data communication mechanism involving an IC module having such a reading and writing function integrated.

DISCLOSURE OF INVENTION

It is an object of the present invention to provide a better non-contact IC card or IC chip including a wireless interface for wireless data access to a memory function from an external reader/writer and a wired interface for connecting with an external device, and a better information processing terminal connected to such an IC card via a wired interface or incorporating such an IC chip when used.

It is another object of the present invention to provide a better data communication system and method in which non-contact data communication can be realized using an IC card.

It is another object of the present invention to provide a better data communication system and method in which desirable non-contact data communication can be realized between an information processing terminal connected to an IC card and a card reading and writing apparatus.

It is another object of the present invention to provide a better three-way communication system with an IC card or IC chip intermediate between a reading and writing apparatus for reading and writing data from and to the IC card or IC chip and an information processing terminal connected to such an IC card via a wired interface or incorporating such an IC chip when used.

It is another object of the present invention to provide a better three-way communication system which makes use of an IC module having integration of a reading and writing apparatus which sends an electromagnetic-wave query signal and an IC card which varies the load across an antenna thereof according to a response signal to the query signal so that a signal that appears in a receiving circuit of the reading and writing apparatus is amplitude-modulated for communication, the IC module being initiated as an IC card by electromagnetic wave detection and as a reading and writing apparatus by a normal power-on operation.

The present invention has been made in order to overcome the aforementioned problems, and, in a first aspect of the present invention, an IC card includes:

a memory for storing predetermined information;

a control unit for controlling access to the memory;

a wireless communication unit for performing wireless communication with a reading and writing apparatus which accesses the memory; and an external interface for connecting to an information processing terminal external to a chip, wherein, for communication with the reading and writing apparatus via the wireless communication unit, data received from the reading and writing apparatus is transmitted to the information processing terminal via the external interface without changing the received data, or after the received data is converted according to an appropriate conversion scheme or is converted into other packet data.

In a second aspect of the present invention, an IC card includes:

a memory for storing predetermined information;

a control unit for controlling access to the memory;

a wireless communication unit for performing wireless communication with a reading and writing apparatus which accesses the memory; and an external interface for connecting to an information processing terminal external to a chip, wherein, for communication with the reading and writing apparatus via the wireless communication unit, data received from the information processing terminal via the external interface is transmitted to the reading and writing apparatus via the wireless communication unit without changing the received data, or after the received data is converted according to an appropriate conversion scheme or is converted into other packet data.

The wireless communication unit can vary a load across an antenna thereof according to a response signal to a query signal from the reading and writing apparatus, so that a signal that appears in a receiving circuit of the reading and writing apparatus is amplitude-modulated for non-contact data communication.

According to the IC card in the first and second aspects of the present invention, data received from a card reading and writing apparatus can be transmitted to an information processing terminal via an external interface without changing the received data, or after the received data is converted according to an appropriate conversion scheme or is converted into other packet data. Conversely, data received from an information processing terminal via an external interface can be transmitted to a card reading and writing apparatus via a non-contact interface without changing the received data, or after the received data is converted according to an appropriate conversion scheme or is converted into other packet data.

Accordingly, an information processing terminal incorporating the IC card according to the first and second aspects of the present invention can communicate data with a card reading and writing apparatus via the IC card.

As an example, it is assumed that a user carries a portable terminal with a built-in IC card, and a public terminal for distributing music or image content or game programs incorporates a card reading and writing apparatus. Once the user passes the portable terminal over the card reading and writing apparatus of the public terminal, non-contact data communication is initiated between the card reading and writing apparatus and the portable terminal to download the desired content or programs into the portable terminal.

The control unit may cause the internal state, which changes according to the wireless communication with the reading and writing apparatus via the wireless communication unit, to be reported to the information processing terminal via the external interface. Alternatively, the control unit may cause the internal state, which changes according to the wireless communication with the reading and writing apparatus via the wireless communication unit, to be reported to the information processing terminal via a dedicated communication path other than the external interface.

The information processing terminal can perform data communication with the reading and writing apparatus via the IC card according to the reported internal state. For example, the information processing terminal can perform data transmission when the IC card has become ready for writing, and can perform data reception when the IC card has become ready for reading.

In a third aspect of the present invention, an information processing terminal which is equipped with an IC chip for performing wireless communication with a reading and writing apparatus includes:

an external interface to which the IC chip is connected; and a control unit for controlling the overall operation of the terminal, wherein data is transmitted to or received from the IC chip via the external interface according to the internal state of the IC chip.

The IC chip incorporated in the information processing terminal varies a load across an antenna thereof according to a response signal to a query signal from the reading and writing apparatus, so that a signal that appears in a receiving circuit of the reading and writing apparatus is amplitude-modulated for non-contact data communication. The IC chip can transmit data received from the reading and writing apparatus to the information processing terminal via the external interface without changing the received data, or after the received data is converted according to an appropriate conversion scheme or is converted into other packet data. Conversely, the IC chip transmits data received from the information processing terminal via the external interface to the reading and writing apparatus via a non-contact interface without changing the received data, or after the received data is converted according to an appropriate conversion scheme or is converted into other packet data.

Accordingly, the information processing terminal according to the third aspect of the present invention can communicate data with the reading and writing apparatus via the IC chip.

The information processing terminal according to the third aspect of the present invention may receive a report about the internal state, which changes according to the wireless communication with the reading and writing apparatus, from the IC chip via the external interface. Alternatively, the information processing terminal may receive a report about the internal state, which changes according to the wireless communication with the reading and writing apparatus, from the IC chip via a dedicated communication path other than the external interface.

Then, the control unit should receive data from the IC chip via the external interface when the IC chip has become ready for reading.

The control unit should transmit data to the IC chip via the external interface when the IC chip has become ready for writing.

In a fourth aspect of the present invention, a three-way data communication method with an IC card or IC chip intermediate between a reading and writing apparatus for reading and writing data from and to the IC card and an information processing terminal connected to the IC card via a wired interface includes:

a step of causing the information processing terminal to query the IC card as to the internal state and causing the IC card to respond to the query;

a step of causing the reading and writing apparatus to poll the IC card;

a step of causing the IC card to receive polling and return a response to the reading and writing apparatus;

a step of causing the reading and writing apparatus to use a service provided by the IC card to communicate data in a non-contact manner with the IC card to write the data to the IC card; and a step of causing the information processing terminal to read the data from the IC card in response to detection of completion of writing data to the IC card by the query about the internal state of the IC card.

In a fifth aspect of the present invention, a three-way data communication method with an IC card or IC chip intermediate between a reading and writing apparatus for reading and writing data from and to the IC card and an information processing terminal connected to the IC card via a wired interface includes:

a step of causing the information processing terminal to use a service provided by the IC card to communicate data with the IC card to write the data to the IC card;

a step of causing the reading and writing apparatus to poll the IC card;

a step of causing the IC card to receive polling and return a response to the reading and writing apparatus after completion of transaction with the information processing terminal; and a step of causing the reading and writing apparatus to use a service provided by the IC card to read the data from the IC card in response to the response from the IC card.

According to the fourth and fifth aspects of the present invention, a data communication system can be achieved among three parties: a card reading and writing apparatus, an IC card for exchanging data with the card reading and writing apparatus via a non-contact interface, and an information processing terminal connected to the IC card via an external wired interface. This data communication system can realize two operations, i.e., "downloading" data to the information processing terminal from the card reading and writing apparatus via the IC card, and, conversely, "uploading" data from the information processing terminal to the card reading and writing apparatus via the IC card.

In a sixth aspect of the present invention, a three-way data transfer system, in which an IC module into which an IC card function unit and a card reading and writing apparatus function unit are integrated intermediates, for transferring data between an external card reading and writing apparatus connected to the IC card function via a wireless communication interface and an information terminal connected to the IC module via a wireless communication interface is configured such that the IC card operates in a wired communication mode in which the IC card reading and writing function unit is initiated in response to activation of an internal power supply to transact with the information processing terminal, and operates in a wireless communication mode in which the IC card function unit is initiated in response to detection of a carrier wave from the external card reading and writing apparatus to transact with the external card reading and writing apparatus;

the IC card, which is in the wired communication mode, is temporarily switched to the wireless communication mode by an activate command, and is returned to the wired communication mode by an inactivate command; and the IC card, which is in the wireless communication mode, is temporarily switched to the wired communication mode by a second activate command from the external card reading and writing apparatus, and is returned to the wireless communication mode by a second inactivate command.

The term "system" refers to a logical set of apparatuses (or function modules for realizing specific functionality), regardless of whether or not the apparatuses or function modules are housed in a single case.

According to the three-way data transfer system in the sixth aspect of the present invention, when the IC card operates in the wired communication mode, first, the information processing terminal issues an activate command to temporarily switch the IC card to the wireless communication mode. Then, the external card reading and writing apparatus writes data to the IC card in the temporary wireless communication mode. In response to completion of writing the data to the IC card, the information processing terminal issues an inactivate command to return the IC card to the wired communication mode to read the data written in the IC card. Thus, the data can be transferred from the external card reading and writing apparatus to the information processing terminal via the IC card.

According the three-way data transfer system in the sixth aspect of the present invention, furthermore, when the IC card operates in the wired communication mode, first, the information processing terminal writes data to the IC card, and then issues an activate command to temporarily switch the IC card to the wireless communication mode. Then, the external card reading and writing apparatus reads the data from the IC card in the temporary wireless communication mode. In response to completion of reading the data from the IC card, the information processing terminal issues an inactivate command to return the IC card to the wired communication mode. Thus, the data can be transferred from the information processing terminal to the external card reading and writing apparatus via the IC card.

According to the three-way data transfer system in the sixth aspect of the present invention, furthermore, when the IC card operates in the wireless communication mode, first, the external card reading and writing apparatus writes data to the IC card, and then issues a second activate command to temporarily switch the IC card to the wired communication mode. Then, the information processing terminal reads the data from the IC card in the temporary wired communication mode. In response to completion of reading the data from the IC card, the external card reading and writing apparatus issues a second inactivate command to return the IC card to the wireless communication mode. Thus, the data can be transferred from the external card reading and writing apparatus to the information processing terminal via the IC card.

According to the three-way data transfer system in the sixth aspect of the present invention, furthermore, when the IC card operates in the wireless communication mode, first, the external card reading and writing apparatus issues a second activate command to temporarily switch the IC card to the wired communication mode. Then, the information processing terminal writes the data to the IC card in the temporary wired communication mode. In completion of writing the data to the IC card, the external card reading and writing apparatus issues a second inactivate command to return the IC card to the wireless communication mode to read the data written in the IC card. Thus, the data can be transferred from the information processing terminal to the external card reading and writing apparatus via the IC card.

Other objects, features, and advantages of the present invention will become apparent from the following more detailed description taken in conjunction with embodiments of the present invention or with reference to the accompanying drawings.

BEST MODE FOR CARRYING OUT THE INVENTION

Embodiments of the present invention are described in detail below with reference to the drawings.

A. Basic Configuration of Non-Contact Data Communication System

The present invention provides a non-contact data communication system using an IC card, and, more specifically, the present invention achieves desirable non-contact data communication between an information processing terminal connected to the IC card and a card reading and writing apparatus.

As an example, it is assumed that a user carries a portable terminal with a built-in IC card, and a public terminal for distributing music or image content or game programs incorporates a card reading and writing apparatus. Once the user passes the portable terminal over the card reading and writing apparatus of the public terminal, non-contact data communication is initiated between the card reading and writing apparatus and the portable terminal to download the desired content or programs into the portable terminal.

Figure 1:
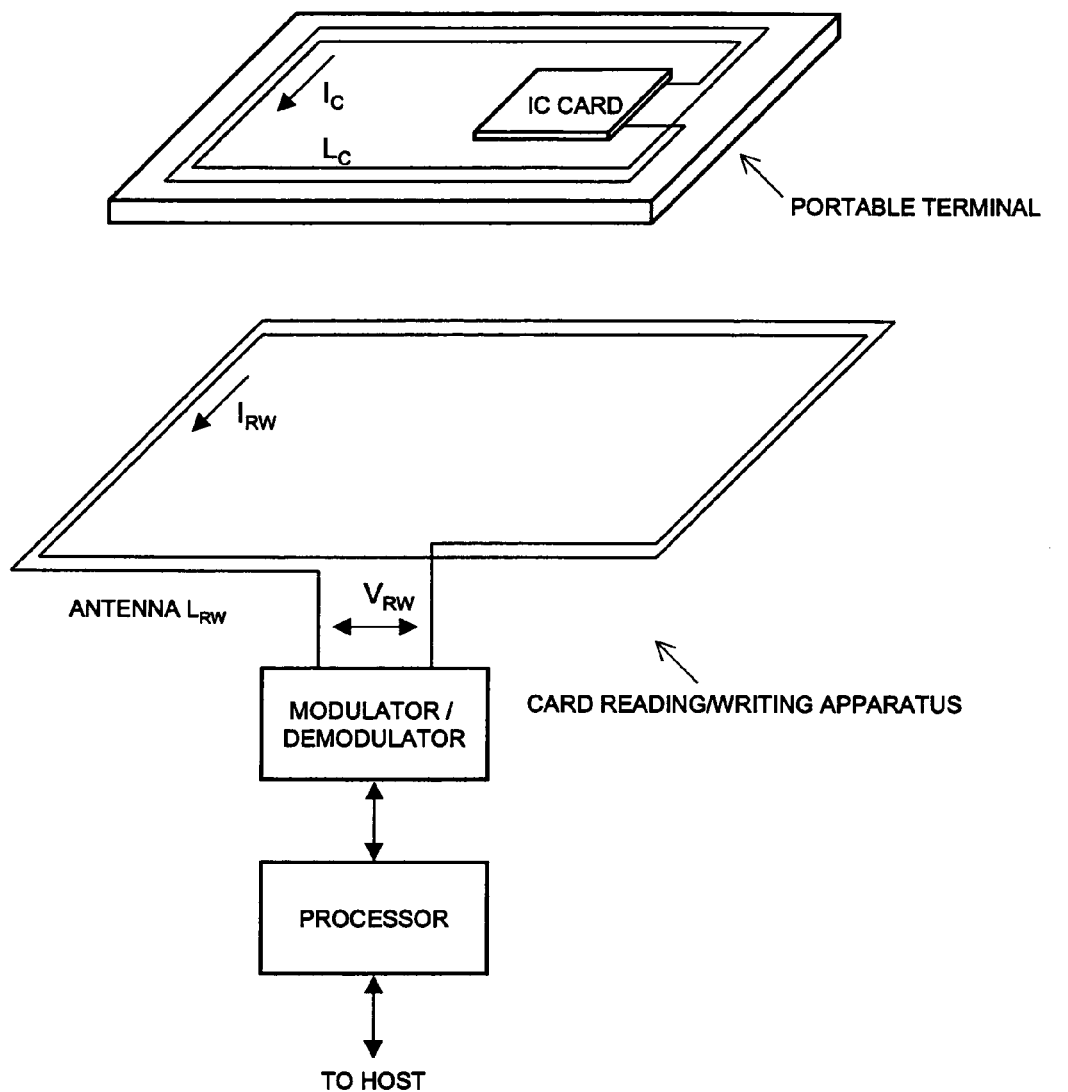
FIG. 1 is a diagram showing the concept of wireless communication based on electromagnetic induction between a card reading and writing apparatus and an IC card.
Figure 2:
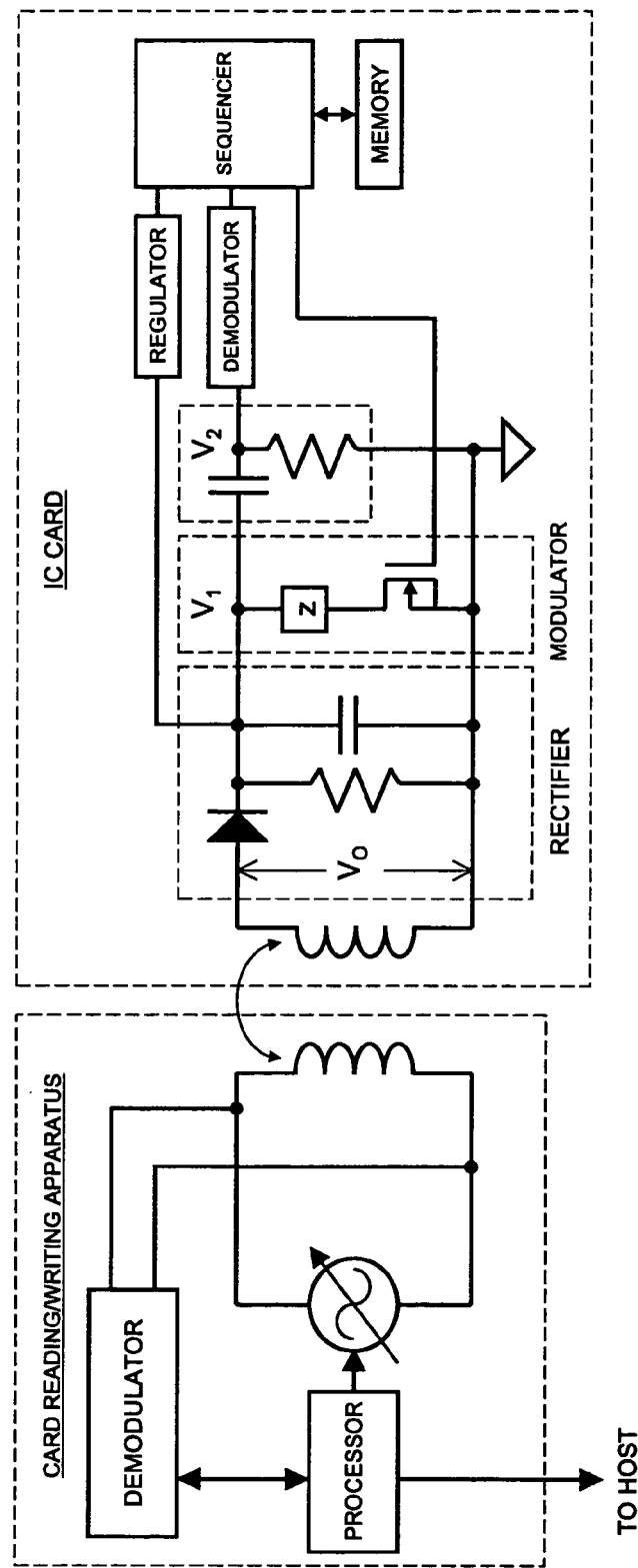
FIG. 2 is a model diagram of the combination of the card reading and writing apparatus and the IC card, which is considered as a single transformer.

First, the structure of non-contact data communication between an IC card and a card reading and writing apparatus is described with reference to FIGS. 1 and 2.

Wireless communication between a card reading and writing apparatus and an IC card is realized based on, for example, the principle of electromagnetic induction. FIG. 1 illustrates the concept of wireless communication based on electromagnetic induction between the card reading and writing apparatus and the IC card. The card reading and writing apparatus includes an antenna $L_{RW}$ formed of a loop coil for generating a magnetic field therearound by causing a current $I_{RW}$ to flow in the antenna $L_{RW}$. The IC card has a loop coil $L_c$ electrically formed around the IC card. An induced voltage caused by the magnetic field generated by the loop antenna $L_c$ of the card reading and writing apparatus is generated at ends of the loop coil $L_c$ of the IC card, and is input to terminals of the IC card that are connected to the ends of the loop coil $L_c$.

Although the degree of coupling of the antenna $L_{RW}$ of the card reading and writing apparatus and the loop coil $L_c$ of the IC card varies depending upon the positional relationship therebetween, the combination of the antenna $L_{RW}$ and the loop coil $L_c$ can be considered as a single transformer. The reading and writing operation for the IC card can be therefore represented as the model shown in FIG. 2.

In the card reading and writing apparatus, the current $I_{RW}$ which flows to the antenna $L_{RW}$ is modulated to modulate a voltage $V_O$ induced in the loop coil $L_c$ on the IC chip. The card reading and writing apparatus can then use this mechanism to transmit data to the IC card.

The IC card has a function (load switching) for varying the load between the terminals of the loop coil $L_c$ according to data to be returned to the card reading and writing apparatus. When the load between the terminals of the loop coil $L_c$ varies, the impedance between the antenna terminals of the card reading and writing apparatus changes, thus causing a change in the flowing current $I_{RW}$ or voltage $V_{RW}$ of the antenna $L_{RW}$. The card reading and writing apparatus demodulates this change so as to receive the data returned from the IC card.

That is, the IC card varies the load across the antenna thereof according to a response signal to a query signal from the card reading and writing apparatus, so that the signal that appears in a receiving circuit of the card reading and writing apparatus is amplitude-modulated for communication.

B. First Embodiment

An IC card according to a first embodiment of the present invention is connected to a portable terminal such as a cellular telephone or a PDA (Personal Digital Assistant), or an information processing terminal such as a personal computer (PC) when used. For this purpose, the IC card includes an external interface for connecting to an external device, in addition to a non-contact interface for connecting to a card reading and writing apparatus. In the following embodiment, the external interface is formed of a wired interface; however, the present invention is not limited thereto, and the external interface may be formed of a wireless interface.

Figure 3:
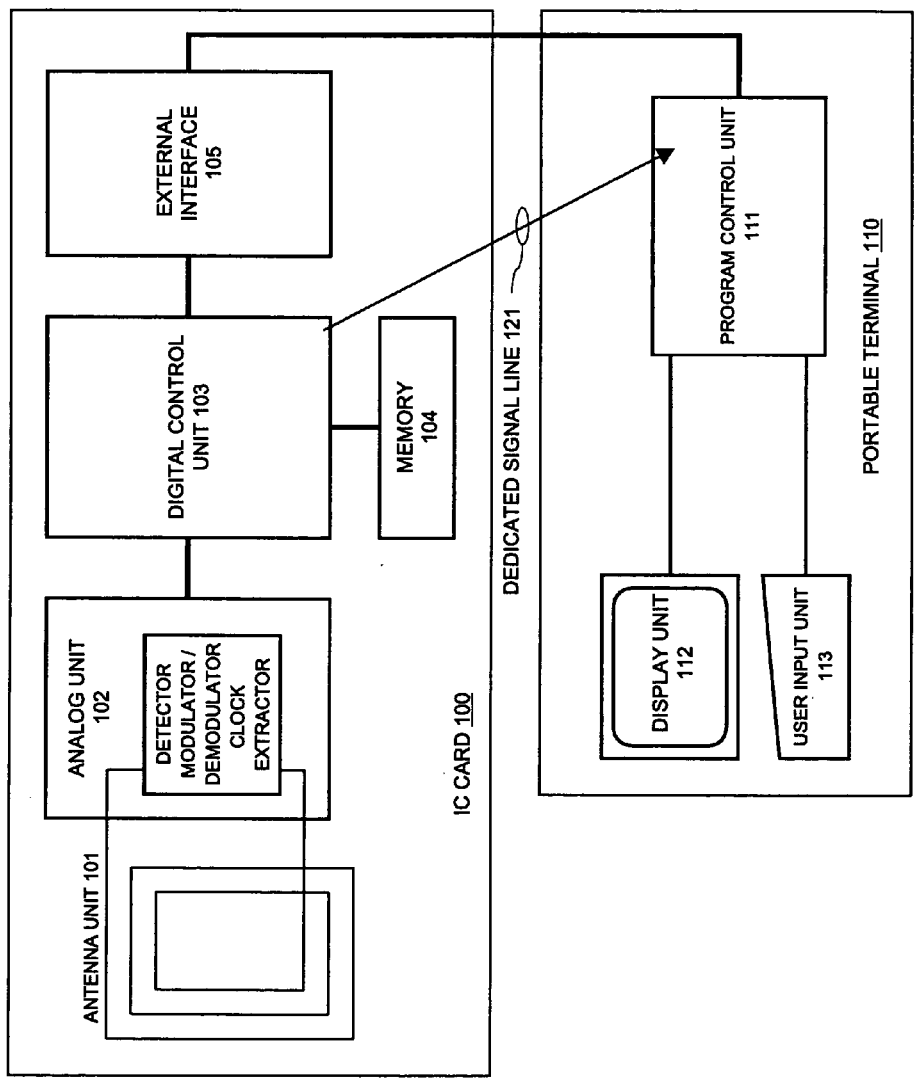
FIG. 3 is a schematic diagram showing the hardware configuration of an IC card 100 according to an embodiment of the present invention.

FIG. 3 schematically illustrates the hardware configuration of an IC card 100 according to an embodiment of the present invention. As shown in FIG. 3, the IC card 100 includes an antenna unit 101, an analog unit 102, a digital control unit 103, a memory 104, and an external interface 105.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

For communication with the card reading and writing apparatus, data received from the card reading and writing apparatus is transmitted to the portable terminal 110 via the external interface without changing the received data, or after the received data is converted according to an appropriate conversion scheme or is converted into other packet data. Conversely, data received from the portable terminal 110 via the external interface is transmitted to the card reading and writing apparatus via the non-contact interface without changing the received data, or after the received data is converted according to an appropriate conversion scheme or is converted into other packet data.

Figure 12:
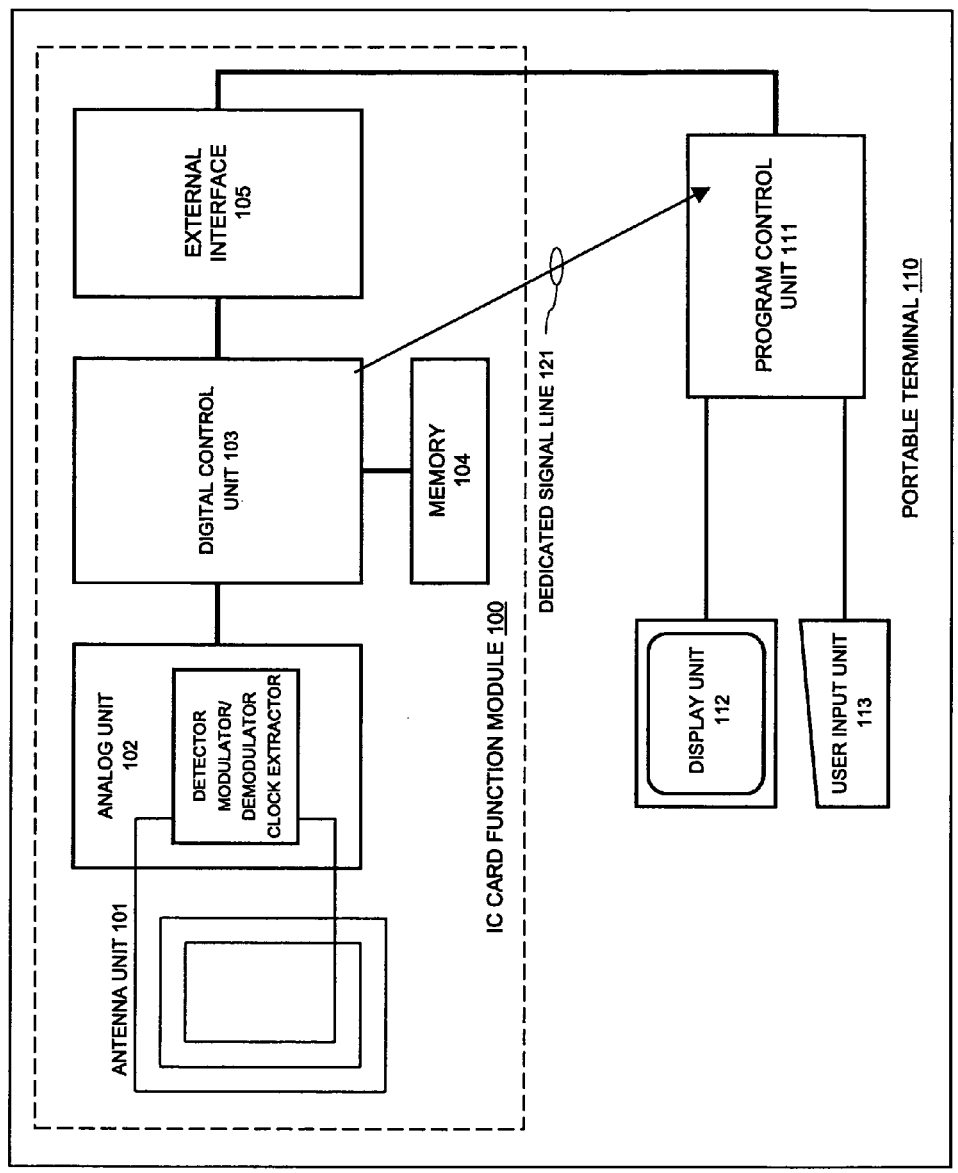
FIG. 12 is a diagram showing a modification of the configuration shown in FIG. 3.

In this embodiment, it is assumed that the IC card 100 is installed in the portable terminal 110 when used, and the external interface 105 is implemented as a wired interface such as a UART or I$^2$C interface (described below). The interface specification of the external interface 105 is not limited in particular, and any other wired interfaces than a UART or I$^2$C interface, such as a SIM interface, may be used. A wireless interface such as a Bluetooth or IEEE.802.11b interface may also be used. The present invention is not limited to the case shown in FIG. 3 in which the IC card 100 is interfaced with the portable terminal 110, and, for example, as shown in FIG. 12, IC card function modules mounted on a single semiconductor chip may be installed in the portable terminal 110.

In the present embodiment, the IC card 100 and the portable terminal 110 are connected with each other via the external interface 105 as well as a dedicated signal line 121. Upon detection of a change in the internal state of the IC card 100, the digital control unit 103 can report this information to the portable terminal 110 via the external interface 105, or directly via the dedicated signal line 121 without intermediation of the external interface 105. The "internal state" used herein includes information indicating that the IC card 100 becomes ready or not ready for data communication with the card reading and writing apparatus.

The IC card 100 can be driven by, for example, a reception wave received from the card reading and writing apparatus via the antenna unit 101. It is to be understood that a part or all components of the IC card 100 may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, and a user input unit 113.

The program control unit 111 includes, for example, a microprocessor, a RAM, and a ROM (these components are not shown in FIG. 6), and the microprocessor uses the RAM for a work area to execute various processing services according to a program code stored in the ROM. The processing services include the original functions of the portable terminal 110, such as a cellular telephone function, and processing for the IC card 100. It is to be understood that the program control unit 111 includes an external storage device such as a hard disk, and other peripheral devices.

The program control unit 111 can access the IC card 100 via the external interface 105.

In this embodiment, the program control unit 111 is directly connected to the IC card 100-2 via the dedicated signal line 121. A change in the internal state of the IC card 100 is reported to the program control unit 111 using the dedicated signal line 121.

The display unit 112 is formed of, for example, a liquid crystal display (LCD). For example, the display unit 112 can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

When a user of the portable terminal 110 with the IC card 100 installed therein passes the portable terminal 110 over a predetermined card reading and writing apparatus, wireless communication is initiated between the IC card 100 and the card reading and writing apparatus, so that data is exchanged between the digital unit 103 and the card reading and writing apparatus via the antenna unit 101 and the analog unit 102, which serve as a wireless interface.

Each time data is exchanged, the internal state, such as a communication phase between the digital control unit 103 and the card reading and writing apparatus, changes. In this embodiment, a specific address of the memory 104 locally connected to the digital control unit 103 is assigned to a status flag indicating the internal state.

The digital control unit 103 directly reports the change in content of the status flag to the program control unit 111 of the portable terminal 110 via the external interface 105 or the dedicated signal line 121.

The program control unit 111 executes processing corresponding to the reported internal state. For example, the internal state is expressed on the display unit 112 by an icon indicating "communication in progress", a dialog for prompting user input is opened, an application corresponding to the internal state is enabled, telephone line connection is performed (in a case of cellular telephone), or access to a LAN or an external network such as the Internet is initiated. Furthermore, when the portable terminal 110 is connected to a telephone network or a network, data communicated between the IC card 100-2 and the card reading and writing apparatus can be transmitted to a host on the network, or, conversely, data downloaded from the host can be transmitted to the card reading and writing apparatus via the IC card 100-2.

Figure 4:
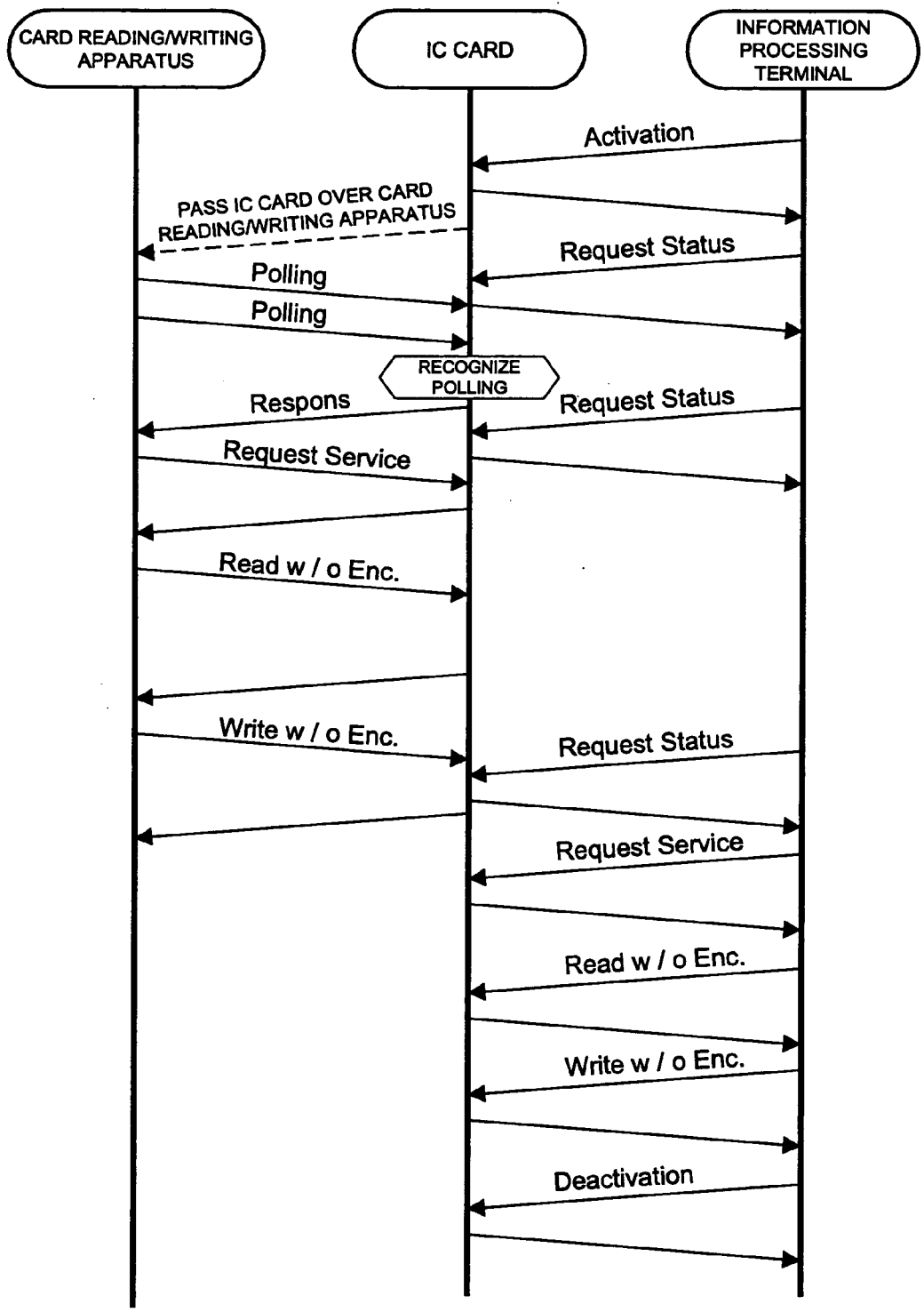
FIG. 4 is a sequence chart for downloading data stored in a card reading and writing apparatus via an IC card to an information processing terminal connected thereto.

FIG. 4 shows the sequence of actions for downloading data stored in the card reading and writing apparatus via the IC card to the information processing terminal connected thereto.

For example, when an IC card activating application starts on the information processing terminal, an Activation message is sent to the IC card via an external wired interface, and the IC card returns a response to this message.

Then, the information processing terminal repeatedly sends a message (Request Status) which queries the internal state to the IC card via the external interface, and the IC card responds to this message.

On the other hand, the card reading and writing apparatus constantly polls the IC card of the IC card using a non-contact interface. When receiving and recognizing polling, the IC card returns a response to the card reading and writing apparatus.

On receipt of the response from the IC card, the card reading and writing apparatus in turn sends a service request message (Request Service) to the IC card and the IC card returns the supported service content.

The card reading and writing apparatus then uses the service provided by the IC card to perform non-contact data communication with the IC card. For example, the card reading and writing apparatus reads data from the IC card, writes data to the IC card, and so on.

During data communication with the card reading and writing apparatus, the IC card constantly updates the internal state. For example, the IC card becomes ready or not ready for reading, ready or not ready for writing, and so on. In the IC card, a specific address of an internal memory space is assigned for indication of the internal state (described above).

The information processing terminal connected to the IC card via the external wired interface continues to query the internal state of the IC card (described above). When the IC card detects completion of the transaction (that is, data downloading) with the card reading and writing apparatus, the information processing terminal sends a service request message (Request Service) to the IC card and the IC card returns the supported service content.

The information processing terminal sends a read request message to the IC card, thus enabling the data written in the IC card to be read or downloaded from the card reading and writing apparatus. The information processing terminal may send a write request message to the IC card.

When the sequence of actions for downloading data from the IC card is completed, the information processing terminal sends a deactivation message to the IC card, and receives a response to this message from the IC card. Then, this process ends.

Figure 5:
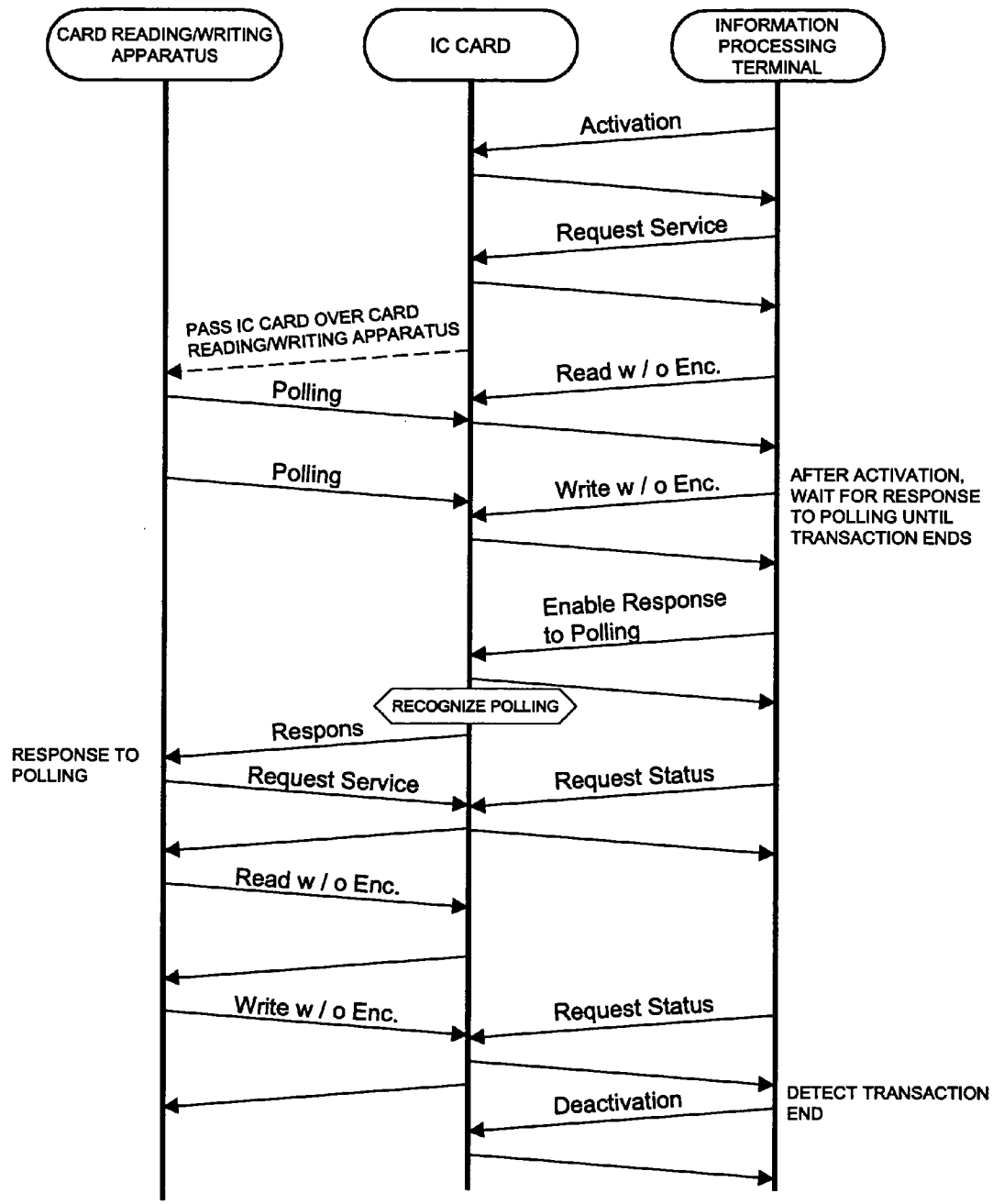
FIG. 5 is a sequence chart for uploading data from an information processing terminal connected to an IC card to a card reading and writing apparatus via the IC card.

FIG. 5 shows the sequence of actions for uploading data from the information processing terminal connected to the IC card to the card reading and writing apparatus via the IC card.

For example, when an IC card activating application starts on the information processing terminal, an Activation message is sent to the IC card via an external wired interface.

Upon receipt of a response from the IC card, the information processing terminal in turn sends a service request message (Request Service) to the IC card and the IC card returns the supported service content.

The information processing terminal then uses the service provided by the IC card to perform data communication with the IC card via the external wired interface. For example, the information processing terminal reads data from the IC card, writes data to the IC card, and so on. The information processing terminal writes to the IC card data to be uploaded to the card reading and writing apparatus.

On the other hand, the card reading and writing apparatus constantly polls the IC card of the IC card using a non-contact interface. After activation by the information processing terminal, the IC card does not respond to polling and puts the card reading and writing apparatus on standby until the transaction with the information processing terminal is completed.

When the transaction with the IC card is completed, the information processing terminal enables the IC card to respond to polling. Then, the information processing terminal repeatedly sends a message (Request Status) to the IC card via the external interface which queries the internal state.

When the response to polling has been enabled, the IC card recognizes polling from the card reading and writing apparatus, and returns the response to the card reading and writing apparatus.

Upon receipt of the response from the IC card, the card reading and writing apparatus in turn sends a service request message (Request Service) to the IC card and the IC card returns the supported service content.

The card reading and writing apparatus then uses the service provided by the IC card to perform non-contact data communication with the IC card. In this case, upload data written in the IC card is read by the information processing terminal.

During data communication with the card reading and writing apparatus, the IC card constantly updates the internal state.

The information processing terminal continues to query the internal state of the IC card (described above). When the IC card detects completion of the transaction (that is, data uploading) with the card reading and writing apparatus, the information processing terminal sends a deactivation message to the IC card, and receives a response to this message from the IC card. Then, this process ends.

The IC card stores a micro-command, which includes a sequence of downloading or uploading steps shown in FIG. 4 or 5, in, for example, an internal ROM 42 or EEPROM 43 of a data processor 40.

C. Second Embodiment

Recent advances in the packaging technology have allowed an IC card function and a card reading and writing apparatus to be integrated into a single semiconductor chip. Such an IC chip is initiated as an IC card by electromagnetic wave detection and as a reading and writing apparatus by a normal power-on operation.

A second embodiment of the present invention is directed to a three-way communication system using an IC module in which the IC card function and card reading and writing apparatus function are integrated.

Figure 6:
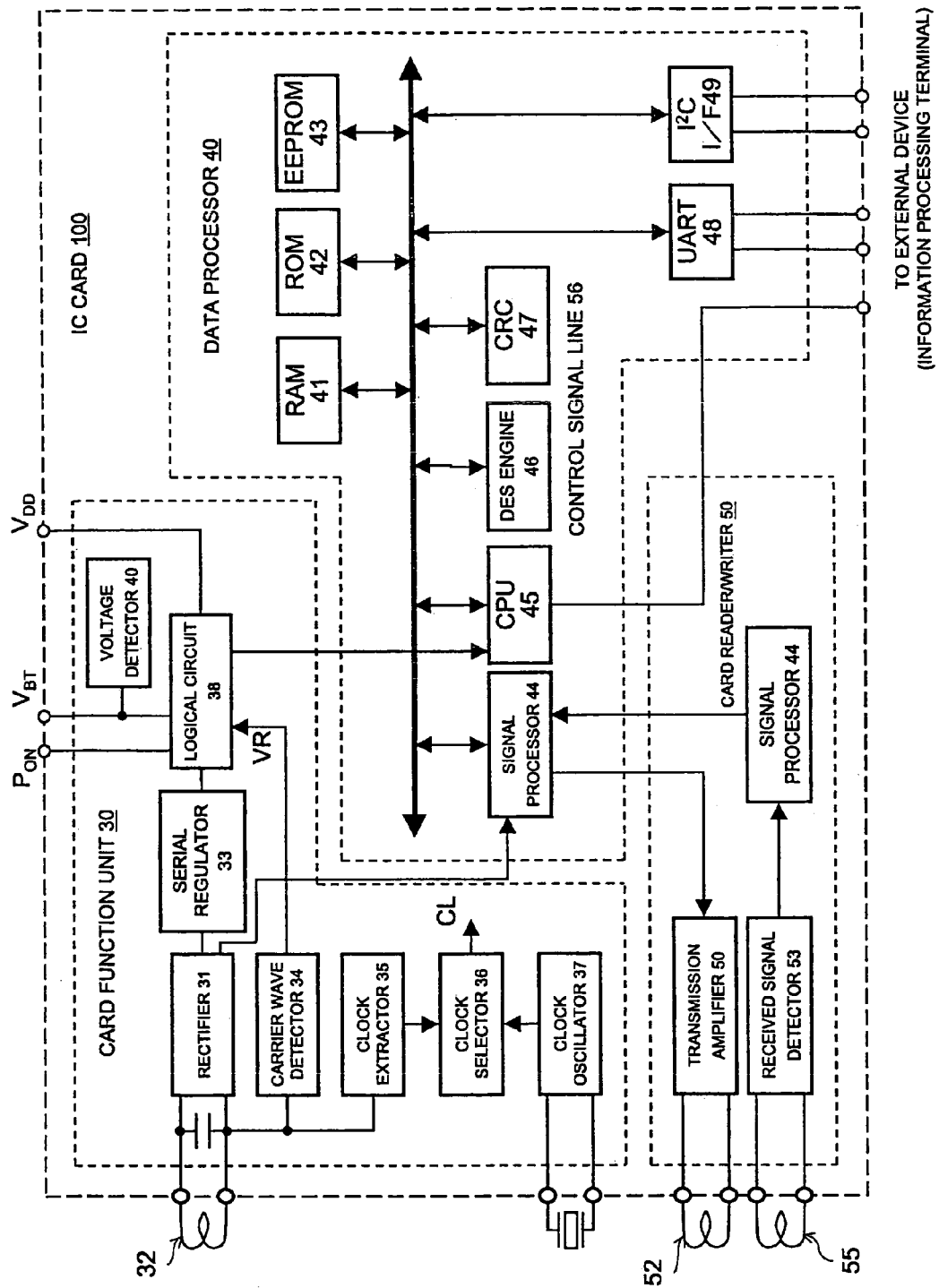
FIG. 6 is a diagram showing in further detail the hardware configuration of the IC card 100 having a reading and writing function integrated.

FIG. 6 illustrates the hardware configuration of an IC card 100 having a reading and writing function integrated. As shown in FIG. 6, the IC card 100 includes a card function unit 30 corresponding to the analog unit 102, a data processor 40 corresponding to the digital control unit 103, the memory 104, and the external interface 105, and a card reader/writer 50.

In the card function unit 30, a carrier wave received by an antenna 32 is rectified by a rectifier 31, and is then supplied to a signal processor 44 of the data processor 40 and to a logical circuit 38 via a serial regulator 33.

The logical circuit 38 controls a voltage from the serial regulator 33 so that a desired power voltage $V_{DD}$ for use in the IC card 100 is supplied.

The serial regulator 33 maintains an output voltage substantially constant, regardless of an input voltage. Specifically, the serial regulator 33 increases the internal impedance when the input voltage is high, and decreases the internal impedance when the input voltage is low, thus making it possible to maintain the voltage.

A voltage detector 39 monitors the output terminal voltage of an external power supply (such as a battery) connected to the logical circuit 38 to output a signal for prohibiting use of the external power supply to the logical circuit 38 when the voltage of the external power supply is below a predetermined voltage.

In the card function unit 30, an electric wave input from the antenna 32 is further checked by a carrier wave detector 34 to determine whether or not the received wave contains a carrier wave. If it contains, a carrier wave detection signal VR is output to the logical circuit 38. The logical circuit 38 can also output to the data processor 40 a signal indicating that a carrier wave has been detected.

A clock extractor 35 extracts clock from the electric wave input from the antenna 32, and supplies it to a clock selector 36. A clock oscillator 37, which is formed of, for example, a crystal oscillator external to the IC card 100, generates clock of a driving frequency for use in the IC card 100, and supplies it to the clock selector 36. The clock selector 36 selects one of the clock supplied from the clock extractor 35 and the clock supplied from the clock oscillator 37, and supplies the selected clock to the components of the IC card 100.

The card reader/writer 50 includes a transmission amplifier 51, a received signal detector 53, a reception amplifier/filter 54, and transmission and reception antennas 52 and 55.

For data transmission, a transmission signal (query signal), which has been subjected to modulation and D/A conversion by the signal processor 44 of the data processor 40 so as to be up-converted into an analog baseband signal, is sent from the antenna 51 via the transmission amplifier. A signal (response signal) received from the antenna 52 is detected by the received signal detector 53, and is amplified by the reception amplifier 54 before being supplied to the signal processor 44. The signal processor 44 down-converts the signal into an analog baseband signal, which is then subjected to D/A conversion and demodulation, thereby reproducing digital data.

The card reading and writing operation between the IC card and the card reading and writing apparatus has been previously described with reference to FIGS. 1 and 2.

The data processor 40 includes the above-noted signal processor 44, a CPU (Central Processing Unit) 45, a DES (Data Encryption Standard) engine 46, a CRC (Cyclic Redundancy Check) 47, a RAM (Random Access Memory) 41, a ROM (Read Only Memory) 42, an EEPROM (Electrically Erasable and Programmable ROM) 43, a UART interface 48, and an I²C interface 49. These components are connected with each other via an internal bus.

The CPU 45 serves as a main controller for controlling the overall operation of the IC card 100 to execute, for example, a program code stored in the ROM 42 (or the EEPROM 43) under the control of the operating system (OS). For example, the CPU 45 executes an application regarding data which is transmitted or received via the card function unit 30 or the card reader/writer 40.

The signal processor 44 performs processing on data to be transmitted via the card function unit 30 or the card reader/writer 40, including modulation, D/A conversion, and up-conversion, and also performs processing on received data, including down-conversion, A/D conversion, and demodulation.

The DES engine 46 encodes and decodes data, which is transmitted or received via the card function unit 30 or the card reader/writer 40, using open-source secret key encoding.

The CRC 47 performs cyclic redundancy checks on data received via the card function unit 30 or the card reader/writer 40.

The UART 48 and the I²C interface 49 form external wired interfaces for connecting the IC card 100 to external devices such as a cellular telephone, a PDA, and a personal computer. The UART (Universal asynchronous receiver transmitter) 48 has functions of converting a parallel signal in a computer into a serial signal, and converting a serial signal into a parallel signal.

The RAM 41 is a rewritable memory device, and the CPU 41 uses the RAM 41 as a work area to execute a program. Since the memory space provided by the RAM 41 is addressable, the CPU 41 or the devices on the internal bus can access this memory space.

The EEPROM 43 is a non-volatile memory device for storing data in an electrically erasable manner. In this embodiment, the EEPROM 43 or the RAM 41 is used for carrying electronic money or an electronic ticket, or any other IC-card-specific application or service.

In this embodiment, the CPU 45 receives a report of carrier wave detection from the card function unit 30 (described above). The CPU 45 which processes data to be transmitted or received data via the signal processor 44 controls the internal state of the IC card 100 according to a communication phase.

A specific address of the memory space extended on the RAM 41 or the EEPRPM 43 is assigned to an internal status flag indicating whether or not a carrier wave has been detected (that is, the communication state) or indicating the internal state of the IC card 100. The CPU 45 updates setting details of the internal status flag according to a change in the communication state or the internal state.

An external device connected via an external wired interface, such as the UART 48 or the I²C interface 49, can also access the internal status flag on the RAM 41 or the EEPROM 43 to recognize the communication state or the internal state of the IC card 100.

In this embodiment, the primary functions of the data processor 40 are to, when the card function unit 30 communicates with a card reading and writing apparatus (not shown), transmit data received from the card reading and writing apparatus to a portable terminal via an external interface without changing the received data, or after the received data is converted according to an appropriate conversion scheme or is converted into other packet data, and, conversely, to transmit data received from a portable terminal via an external interface to the card reading and writing apparatus via a non-contact interface without changing the received data, or after the received data is converted according to an appropriate conversion scheme or is converted into other packet data. The card reading and writing apparatus is, for example, a public terminal for downloading program or content data.

In this embodiment, the IC card 100 is configured such that the card function unit 30 is initiated in response to detection of a carrier wave from an external card reading and writing apparatus and the card reader/writer 50 is initiated in response to activation of an internal power supply. The IC card 100 has also a "wired communication mode" for transacting with an information processing terminal (not shown) via a wired interface such as a UART interface, and a "wireless communication mode" for transacting with an external card reading and writing apparatus via a non-contact interface based on electromagnetic induction.

The data communication system according to this embodiment is formed of three parties: a card reading and writing apparatus, an IC card for exchanging data with the card reading and writing apparatus via a non-contact interface, and an information processing terminal connected to the IC card via an external wired interface. The data communication system realizes two operations, i.e., "downloading" data to the information processing terminal from the card reading and writing apparatus via the IC card, and, conversely, "uploading" data from the information processing terminal to the card reading and writing apparatus via the IC card.

C-1. Overview of Three-Way Communication

Signal lines (UART serving as a wired interface, POW_ON for controlling the internal power supply, IBO3 indicating the state of three-way communication, and VRO for outputting carrier wave detection) for use in three-way communication using a non-contact interface according to this embodiment realize the following three functions:

(1) data transfer from the external card reading and writing apparatus to the information processing terminal via the card function unit 30 (192 bytes);

(2) data transfer from the information processing terminal to the external card reading and writing apparatus via the card function unit 30 (192 bytes); and (3) access to the EEPROM 43 of the IC card 100 from both the external card reading and writing apparatus and the information processing terminal.

In order to realize the above functions, in addition to standard commands, the following commands are added:

Activate command for temporarily switching from the wired communication mode to the wireless communication mode;

Inactivate command for returning the wireless communication mode enabled by the Activate command to the wired communication mode;

Activate 2 command for temporarily switching from the wireless communication mode to the wired communication mode by this command from the external card reading and writing apparatus;

Inactivate 2 command for returning the temporarily enabled wired communication mode to the wireless communication mode by this command from the external card reading and writing apparatus;

Push command for sending data to the IC card in the wired and wireless communication modes;

Pull command for taking out data from the IC card in the wired and wireless communication modes; and Get Status command for taking out an action flag, which is set by the Activate or Activate 2 command.

The fundamental operation of three-way communication after the IC card 100 is initiated is as follows:

(1) In a Case where the IC Card 100 is Initiated by Operating the Power Supply Control Line (POW_ON) using the Internal Controller:

When the IC card 100 is initiated by POW_ON and operates in the wired communication mode, the IC card 100 is not able to perform wireless communication via the card reader/writer 50. In this situation, when data is to be transferred from the external card reading and writing apparatus to the information processing terminal via the IC card 100, the following procedure is performed:

① First, an Activate command is issued by the information processing terminal to the IC card 100 via a wired interface such as a UART interface. Then, the IC card is enabled for three-way communication, and waits for a command from the external card reading and writing apparatus.

② Then, the external card reading and writing apparatus sends data to the IC card 100 using a Push command which follows Polling and Get Status commands. In response, the IC card 100 waits for a command from the information processing terminal via the wired interface.

③ When the information processing terminal issues an Inactivate command to the IC card 100, communication via the wireless interface is prohibited. Then, the information processing terminal issues a Pull command to take in the data.

Accordingly, data transfer from the external card reading and writing apparatus to the information processing terminal via the IC card 100 can be realized. When data is to be transferred from the information processing terminal to the external card reading and writing apparatus via the IC card 100, the following procedure is performed:

① First, an Activate command which follows a Push command is issued by the information processing terminal to the IC card 100 via a wired interface such as a UART interface. In response, the IC card 100 is enabled for three-way communication, and waits for a command from the external card reading and writing apparatus.

② Then, the external card reading and writing apparatus sends data to the IC card 100 using a Pull command which follows Polling and Get Status commands. In response, the IC card 100 waits for a command from the information processing terminal via the wired interface.

③ The information processing terminal issues an Inactivate command to the IC card 100.

Accordingly, data transfer from the information processing terminal to the external card reading and writing apparatus via the IC card 100 can be realized.

The Push command and the Pull command are used to exchange plaintext data which is not encoded. Secret or confidential data transfer requires encoding.

When a series of operations by the external card reading and writing apparatus is completed, the IC card 100 switches the IBO3 terminal to the low state for notification. This signal triggers the information processing terminal connected via the wired interface to issue an Inactivate command to terminate three-way communication.

Other than the above-described data transfer using the Push and Pull commands, existing commands of the non-contact interface can be used to access the service memory (EEPROM 43) during three-way communication. For example, a PIN is disabled from the information processing terminal. When the external card reading and writing apparatus accesses a PIN-disabled service or area, the information processing terminal disables the PIN via the wired interface using a Write w/o Encryption command, and issues an Activate command to enable three-way communication, after which the external card reading and writing apparatus accesses the PIN-disabled service or area via the wireless interface using a standard command.

(2) In a Case where the IC Card 100 is Initiated by the Electromagnetic Field (Query Signal) of the External Card Reading and Writing Apparatus:

When the IC card 100 is initiated by a carrier wave from the external card reading and writing apparatus and operates in the wireless communication mode, typically, the IC card 100 is not able to communicate with the information processing terminal via a wired interface such as a UART interface. In this situation, when data is to be transferred from the external card reading and writing apparatus to the information processing terminal via the IC card 100, the following procedure is performed:

① First, the external card reading and writing apparatus continues to send data to the IC card 100 using a Push command, and issues an Activate 2 command. In response, the IC card 100 is enabled for three-way communication, and waits for a command from the information processing terminal via the wired interface.

② Then, the information processing terminal issues a Pull command which follows a Get Status command to the IC card 100 to receive the data. In response, the IC card 100 is disabled for three-way communication, and waits for a command from the external card reading and writing apparatus.

Accordingly, data transfer from the external card reading and writing apparatus to the information processing terminal can be realized. When data is to be transferred from the information processing terminal to the external card reading and writing apparatus via the IC card 100, the following procedure is performed:

① First, the external card reading and writing apparatus issues an Activate 2 command. In response, the IC card 100 is enabled for three-way communication, and waits for a command from the information processing terminal via a wired interface such as a UART interface.

② Then, the information processing terminal issues a Push command which follows a Get Status command to the IC card 100 to receive the data. In response, the IC card 100 is disabled for three-way communication, and waits for a command from the external card reading and writing apparatus.

③ Then, the external card reading and writing apparatus issues a Pull command to the IC card 100.

Accordingly, data transfer from the information processing terminal to the external card reading and writing apparatus can be realized. Similarly to the case where the IC card 100 is initiated by the power control line (POW_ON) (described above), since the Push command and the Pull command are used to exchange plaintext data which is not encoded, when secret or confidential data transfer or the transaction with the external card reading and writing apparatus is completed, the IC card 100 switches the IBO3 terminal to the low state for notification. This signal triggers the information processing terminal to issue an Inactivate command to terminate three-way communication.

C-2. Method of Using Three-Way Communication when the IC Card is Initiated in the Wired Communication Mode The IC card 100 according to this embodiment operates in the "wired communication mode" in which the card reader/writer 50 is initiated in response to activation of an internal power supply to transact with an information processing terminal (not shown) via a wired interface such as a UART interface (described above). In this section, a method of using three-way communication when the IC card 100 is initiated in the wired communication mode is described in detail.

Figure 7:
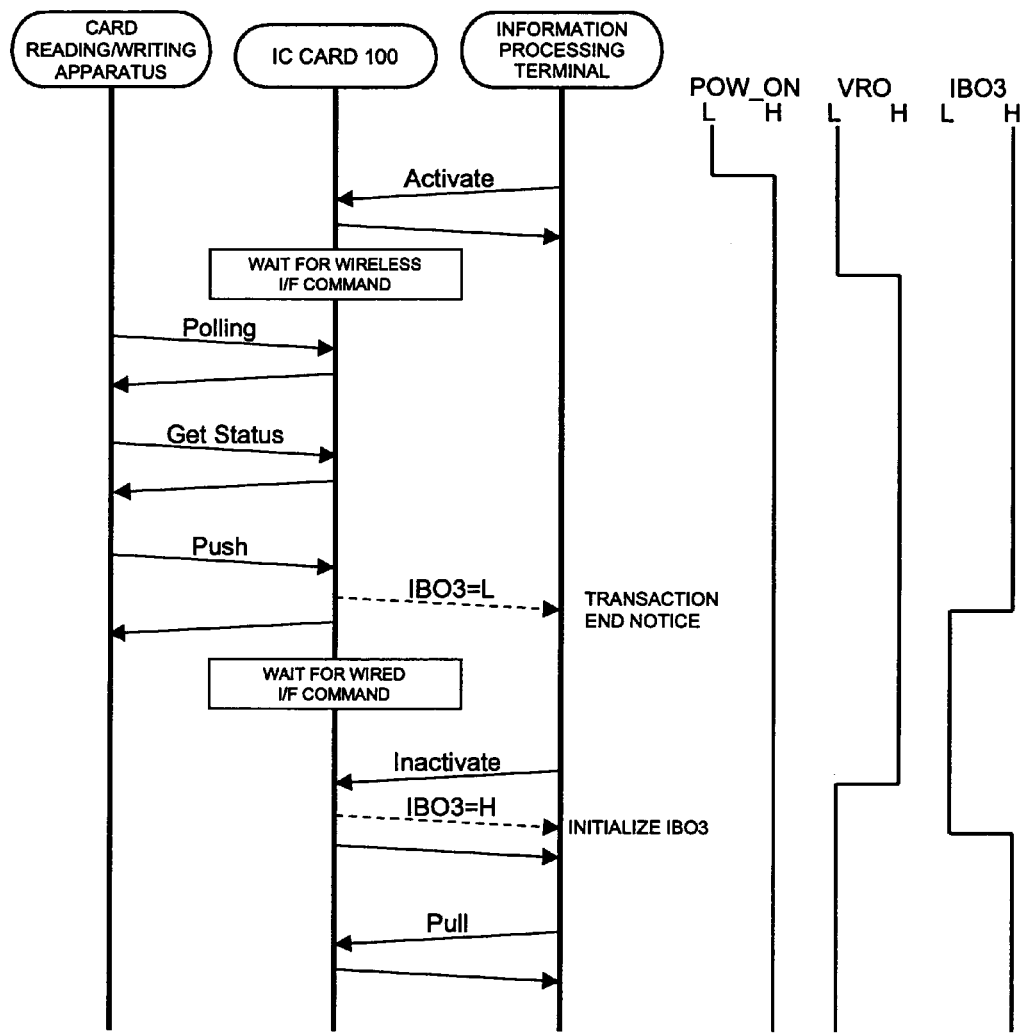
FIG. 7 is a chart showing the sequence of operations for transmitting data from the external card reading and writing apparatus to the information processing terminal when the IC card 100 is initiated in a wired communication mode.

C-2-1. Data Transfer from the External Card Reading and Writing Apparatus to the Information Processing Terminal FIG. 7 shows a sequence of actions for transmitting data from the external card reading and writing apparatus to the information processing terminal when the IC card 100 is initiated in the wired communication mode.

(1) When the information processing terminal issues an Activate command to the IC card 100 after the IC card 100 is initiated, the IC card 100 waits for a command from the external card reading and writing apparatus. In this situation, the commands which can be received by the IC card 100 from the external card reading and writing apparatus are Polling, Get Status, and Push or Pull.

(2) A Get Status command is issued by the external card reading and writing apparatus.

(3) Based on a response to the Get Status command, the external card reading and writing apparatus determines whether or not data can be transmitted to the information processing terminal, and issues a Push command to write the data to the RAM 41 or EEPROM 43 of the IC card 100.

(4) After the Push command has been issued, the IC card 100 switches the IBO3 terminal to the low level to send a termination notice. The IC card 100 returns the corresponding response to the external card reading and writing apparatus, and is then able to receive commands from the information processing terminal via a wired interface such as a UART interface.

(5) When detecting the termination notice from the IC card 100, the information processing terminal issues an Inactivate command to prohibit communication from the external card reading and writing apparatus to the IC card 100.

(6) When receiving the Inactivate command, the IC card 100 returns the IBO3 terminal to the high level, and sends a response back to the Inactivate command.

(7) The information processing terminal issues a Pull command to read the content written in the RAM 41 or EEPROM 43 of the IC card 100.

The information processing terminal can shut off power supply of the IC card 100 (switch POW_ON to the low state) under the specific timeout control without waiting for completion detection. Next time the IC card 100 is initiated, the IBO3 terminal is initialized to the high level.

Figure 8:
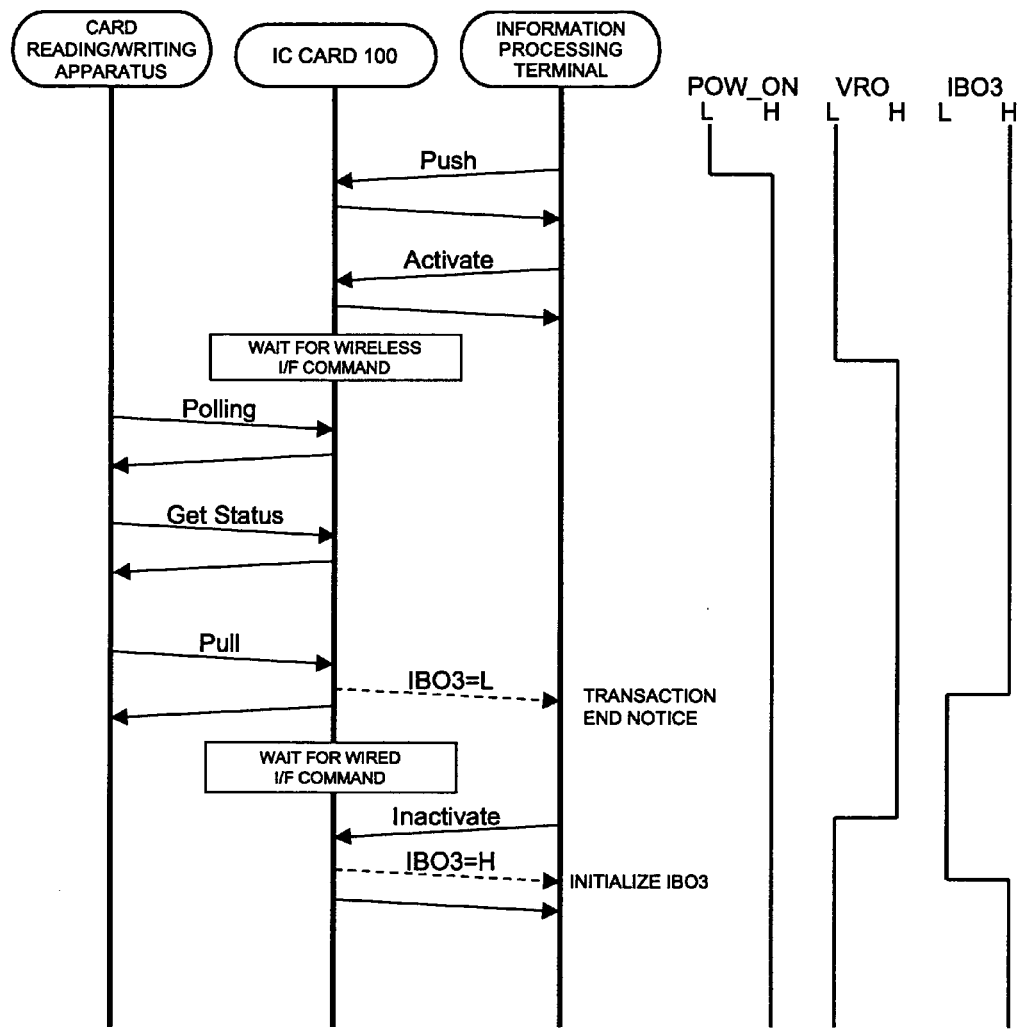
FIG. 8 is a chart showing the sequence of operations for transmitting data from the information processing terminal to the external card reading and writing apparatus when the IC card 100 is initiated in a wired communication mode.

C-2-2. Data Transfer from the External Card Reading and Writing Apparatus to the Information Processing Terminal FIG. 8 shows a sequence of actions for transmitting data from the information processing terminal to the external card reading and writing apparatus when the IC card 100 is initiated in the wired communication mode.

(1) After the IC card 100 is initiated, the information processing terminal issues a Push command to write the data to the RAM 41 or EEPROM 43 of the IC card 100.

(2) When the information processing terminal issues an Activate command, the IC card 100 waits for a command from the external card reading and writing apparatus. In this situation, the commands to be received by the IC card 100 from the external card reading and writing apparatus are Polling, Get Status, and Push or Pull.

(3) The external card reading and writing apparatus issues the gET Status command in order to confirm the request from the information processing terminal.

(4) Based on a response to the Get Status command, the external card reading and writing apparatus determines whether or not data can be received from the information processing terminal, and then issues a Pull command to read the data written in the RAM 41 or EEPROM 43 of the IC card 100.

(5) After the Pull command has been issued, the IC card 100 switches the IBO3 terminal to the low level. The IC card 100 returns the corresponding response to the external card reading and writing apparatus, and is then able to receive commands from the information processing terminal via a wired interface such as a UART interface.

(6) When detecting a termination notice, the information processing terminal issues an Inactivate command to prohibit communication from the outside to the IC card 100.

(7) When receiving the Inactivate command, the IC card 100 returns the IBO3 terminal to the high level, and then sends a response back to the Inactivate command.

The information processing terminal can shut off power supply of the IC card 100 (switch POW_ON to the low state) under the specific timeout control without waiting for completion detection. Next time the IC card 100 is initiated, the IBO3 terminal is initialized to the high level.

C-2-3. Use of Commands of the IC Card 100 During Three-Way Communication

Figure 9:
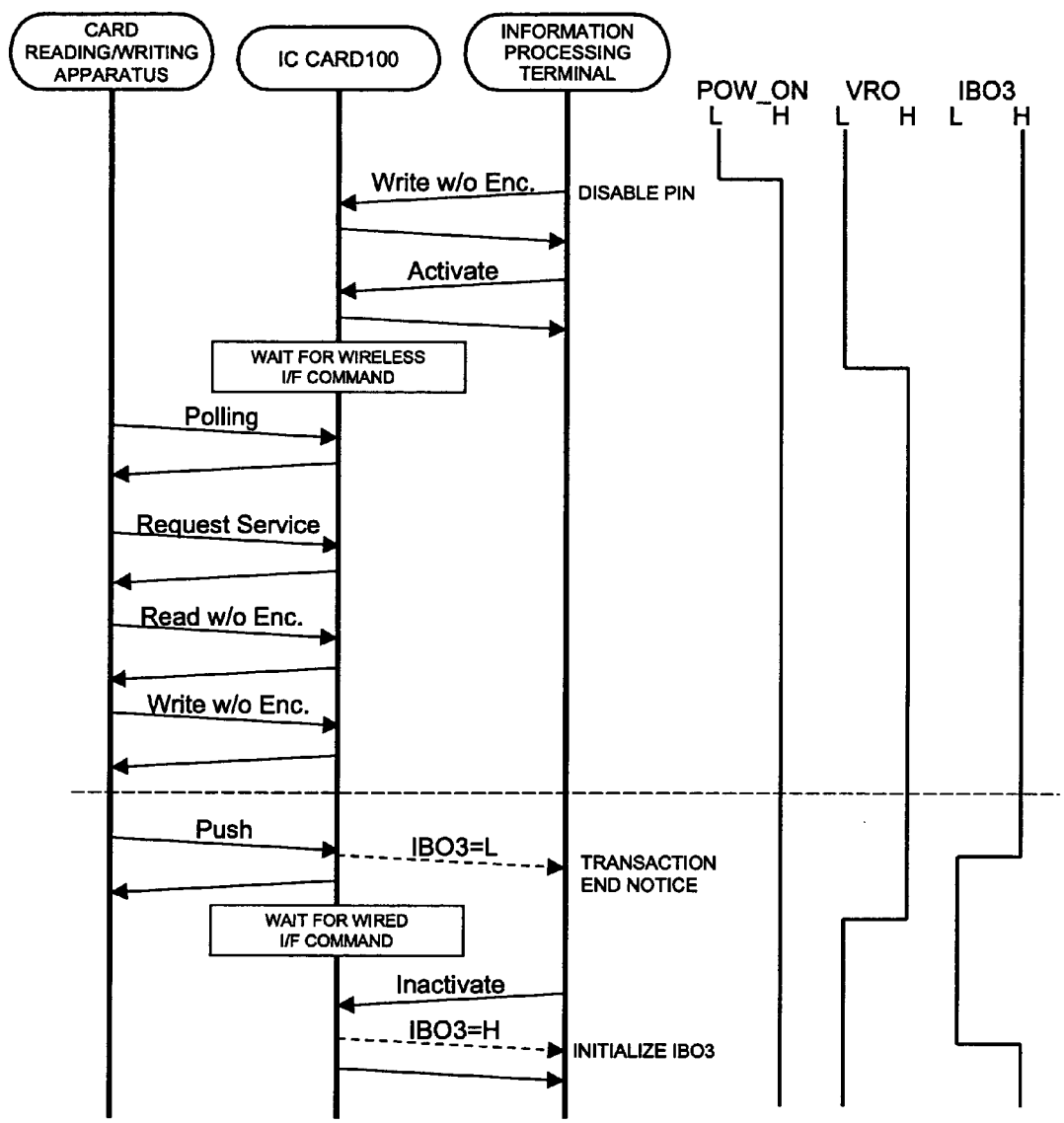
FIG. 9 is a chart showing the sequence of operations for three-way communication using commands of the IC card 100.

FIG. 9 shows a sequence of actions for three-way communication using commands of the IC card 100.

(1) Mutual authentication is performed between a higher-level server and the IC card 100, if necessary.

(2) After the IC card 100 is initiated, the information processing terminal accesses a desired service via a wired interface such as a UART interface using a wired access subcommand such as Read or Write.

(3) If mutual authentication was performed, the mode is returned to mode 0 by a Read Mode command. Alternatively, the POW_ON terminal is switched to the low level to power off the IC card 100, and the POW_ON terminal is switched again to the high level to initiate the IC card 100, resulting in a similar mode.

(4) Then, when an Activate command is issued, the IC card 100 waits for a command from the external card reading and writing apparatus. In this situation, the IC card 100 receives an arbitrary command from the external card reading and writing apparatus.

(5) Mutual authentication is performed between the external card reading and writing apparatus and the IC card 100, if necessary.

(6) A Read command, a Write command, or the like is issued by the external card reading and writing apparatus, thus allowing access to a target service.

(7) When a Push or Pull command is issued by the external card reading and writing apparatus, the IC card 100 can send a termination notice to the information processing terminal. The conditions of termination are set by an action flag (in this case, the Push or Pull command can be used for data transfer: the Push or Pull command in case of no data transfer is a dummy command for termination notice). When a termination notice is not sent, the information processing terminal can forcibly terminate the three-way communication by the IC card 100 under its own timeout control or, if the VRO terminal is in the low level, which indicates that carrier waves from the external card reading and writing apparatus are no longer detected, using a VRO signal. Next time the IC card 100 is initiated, the IBO3 terminal is initialized to the high level.

When a keyed service is accessed during three-way communication, if the Push or Pull command is not used for termination notice, the mode is still maintained as mode 1 or higher after mutual authentication. This situation is undesirable for security management, and appropriate means, such as timeout processing, shutdown of power supply after use, and VRO monitoring, is preferably used to prevent such a situation from continuing for a long time.

C-3. Method of Using Three-Way Communication when the IC Card is Initiated in the Wireless Communication Mode The IC card 100 according to this embodiment operates in the "wireless communication mode" in which the card function unit 30 is initiated in response to detection of a carrier wave (query signal) from the external card reading and writing apparatus to transact with an external card reading and writing apparatus (not shown) via a wireless interface (described above). In this section, a method of using three-way communication when the IC card 100 is initiated in the wireless communication mode is described in detail.

Figure 10:
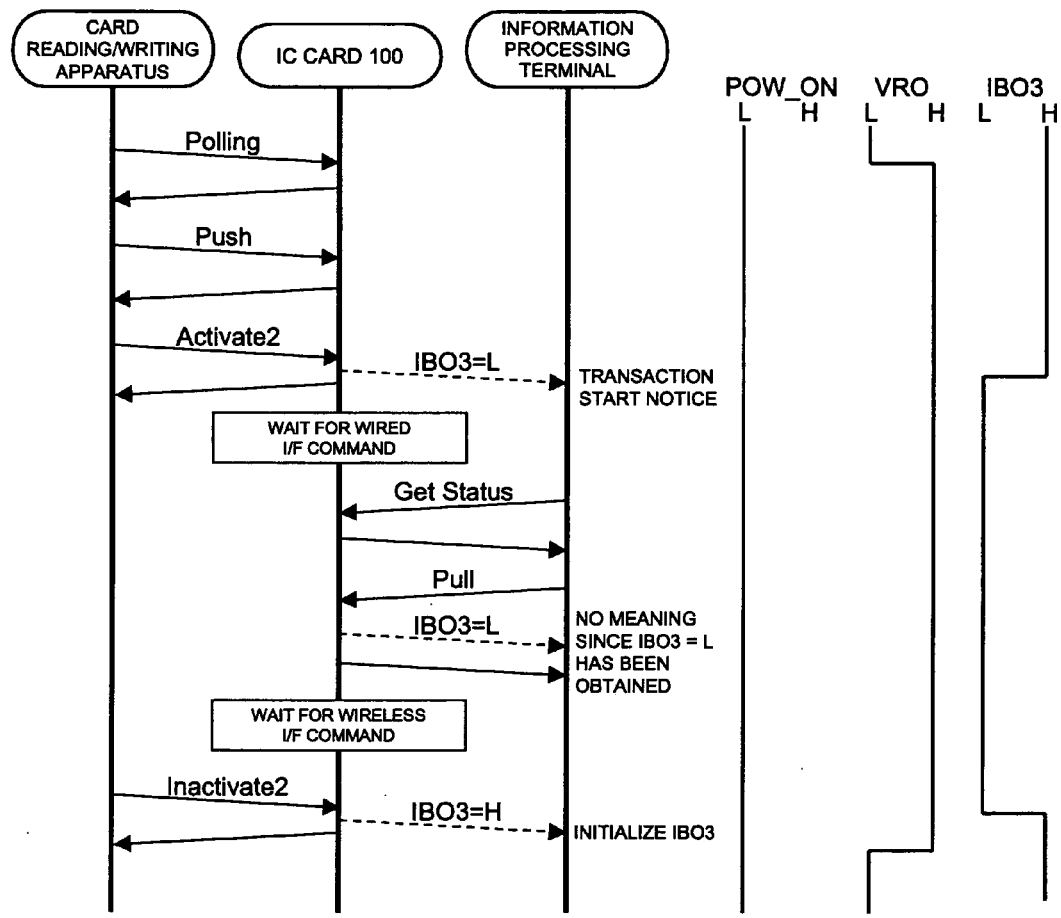
FIG. 10 is a chart showing the sequence of operations for transmitting data from the external card reading and writing apparatus to the information processing terminal when the C card 100 is initiated in a wireless communication mode.

C-3-1. Data Transfer from the External Card Reading and Writing Apparatus to the Information Processing Terminal FIG. 10 shows a sequence of actions for transmitting data from the external card reading and writing apparatus to the information processing terminal when the IC card 100 is initiated in the wireless communication mode.

(1) After the IC card 100 is initiated, the external card reading and writing apparatus issues a Push command to the IC card 100 to write the data to the RAM 41 or EEPROM 43 of the IC card 100.

(2) Then, the external card reading and writing apparatus issues an Activate 2 command. In response, the IC card 100 switches the IBO3 terminal to the low level to notify completion of data writing. The IC card 100 returns a response to the Activate 2 command, and then waits for a command from the information processing terminal via a wired interface such as a UART interface. In this situation, the commands to be received by the IC card 100 from the information processing terminal are Get Manufacture ID, Get Status, and Push or Pull.

(3) A Get Status command is issued by the information processing terminal in order to confirm the request from the external card reading and writing apparatus.

(4) When it is determined, based on a response to the Get Status command, that data should be received from the external card reading and writing apparatus, the information processing terminal issues a Pull command to read the content of the RAM 41 or EEPROM 43 of the IC card 100.

(5) The IC card 100 returns a response to the Pull command to the controller, and then waits for a command from the wireless interface.

(6) The external card reading and writing apparatus issues an Inactivate 2 command to prohibit the wired communication by the IC card 100. The Inactivate 2 command may be issued immediately after the Activate 2 command was issued, but confirmation of termination is enabled when the Inactivate 2 command has successfully responded.

(7) After receiving the Inactivate 2 command, the IC card 100 returns the IBO3 terminal to the high level, and then sends a response back to the Inactivate 2 command.

Figure 11:
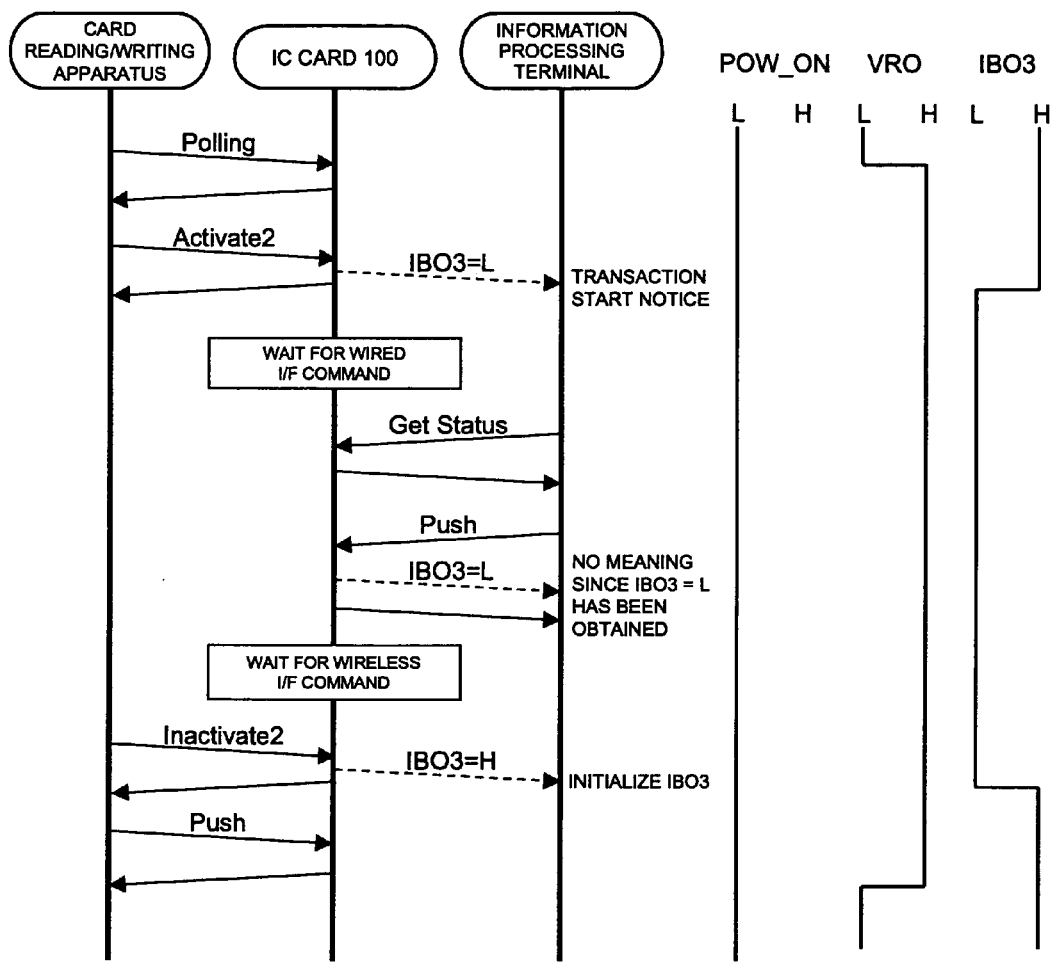
FIG. 11 is a chart showing the sequence of operations for transmitting data from the information processing terminal to the external card reading and writing apparatus when the IC card 100 is initiated in a wireless communication mode.

C-3-2. Data Transfer from the Information Processing Terminal to the External Card Reading and Writing Apparatus FIG. 11 shows a sequence of actions for transmitting data from the information processing terminal to the external card reading and writing apparatus when the IC card 100 is initiated in the wireless communication mode.

(1) After the IC card 100 is initiated, the external card reading and writing apparatus issues an Activate 2 command to the IC card 100. In response, the IC card 100 switches the IBO3 terminal to the low level to report to the information processing terminal that the IC card 100 has become ready for reading data in three-way communication. The IC card 100 returns a response to the Activate 2 command, and then waits for a command from the information processing terminal via a wired interface such as a UART interface. In this situation, the commands to be received by the IC card 100 from the information processing terminal are Get Manufacture ID, Get Status, and Push or Pull.

(2) A Get Status command is issued by the information processing terminal in order to confirm the request of the external card reading and writing apparatus.

(3) Based on a response to the Get Status command, the external card reading and writing apparatus determines whether or not data can be transmitted, and then issues a Push command to write the data to the RAM 41 or EEPROM 43 of the IC card 100.

(4) The IC card 100 returns a response to the Push command to the information processing terminal, and then waits for a command from the wireless interface.

(5) The external card reading and writing apparatus issues an Inectivate 2 command to prohibit the wired communication by the IC card 100. The Inactivate 2 command may be issued immediately after the Activate 2 command was issued, but confirmation of termination is enabled when the inactivate 2 command has successfully responded.

(6) After receiving the Inactivate 2 command, the IC card 100 returns the IBO3 terminal to the high level, and then sends a response back to the Inactivate 2 command.

(7) Then, the external card reading and writing apparatus issues the IC card 100 to read the data stored in the RAM 41 or EEPROM 43 of the IC card 100.

Appendix

The present invention has been described in detail with reference to specific examples. However, it is obvious that modifications or replacements may be made to the embodiment by those skilled in the art without departing from the spirit and scope of the present invention. The present invention has been disclosed in an exemplary form, and this form should not be construed as the restricted one. Reference should be made to the claims for delineation of the scope of the present invention.

INDUSTRIAL APPLICABILITY

According to the present invention, there can be provided a better non-contact IC card or IC chip including a wireless interface for wireless data access to a memory function from an external reader/writer and a wired interface for connecting with an external device, and a better information processing terminal connected to such an IC card via a wired interface or incorporating such an IC chip when used.

According to the present invention, furthermore, there can be provided a better data communication system and method in which non-contact data communication can be realized using an IC card.

According to the present invention, furthermore, there can be provided a better data communication system and method in which desirable non-contact data communication can be realized between an information processing terminal connected to an IC card and a card reading and writing apparatus.

According to the IC card of the present invention, data received from a card reading and writing apparatus can be transmitted to an information processing terminal via an external interface without changing the received data, or after the received data is converted according to an appropriate conversion scheme or is converted into other packet data. Conversely, data received from an information processing terminal via an external interface can be transmitted to a card reading and writing apparatus via a non-contact interface without changing the received data, or after the received data is converted according to an appropriate conversion scheme or is converted into other packet data. Accordingly, an information processing terminal incorporating the IC card according to the present invention can communicate data with the card reading and writing apparatus with the IC card.

According to the present invention, furthermore, there can be provided a better three-way communication system with an IC card or IC chip intermediate between a reading and writing apparatus for reading and writing data from and to the IC card or IC chip and an information processing terminal connected to such an IC card via a wired interface or incorporating such an IC chip when used.

According to the present invention, furthermore, there can be provided a better three-way communication system which makes use of an IC module having integration of a reading and writing apparatus which sends an electromagnetic-wave query signal and an IC card which varies the load across an antenna thereof according to a response signal to the query signal so that a signal that appears in a receiving circuit of the reading and writing apparatus is amplitude-modulated for communication, the IC module being initiated as an IC card by electromagnetic wave detection and as a reading and writing apparatus by a normal power-on operation.

The invention claimed is:

1. A three-way data transfer system, in which an IC module into which an IC card function unit and a card reading and writing apparatus function unit are integrated intermediates, for transferring data between an external card reading and writing apparatus connected to the IC card function unit via a wireless communication interface and an information terminal connected to the IC module via a wired communication interface,
   wherein the IC card operates in a wired communication mode in which the card reading and writing apparatus function unit is initiated in response to activation of an internal power supply to transact with the information processing terminal, and operates in a wireless communication mode in which the IC card function unit is initiated in response to detection of a carrier wave from the external card reading and writing apparatus to transact with the external card reading and writing apparatus;
   the IC card, which is in the wired communication mode, is temporarily switched to the wireless communication mode by an activate command, and is returned to the wired communication mode by an inactivate command; and
   the IC card, which is in the wireless communication mode, is temporarily switched to the wired communication mode by a second activate command from the external card reading and writing apparatus, and is returned to the wireless communication mode by a second inactivate command.

2. A three-way data transfer system according to claim 1, wherein, for data transfer from the external card reading and writing apparatus to the information processing terminal via the IC card when the IC card is in the wired communication mode,
   the information processing terminal issues the activate command to temporarily switch the IC card to the wireless communication mode,
   the external card reading and writing apparatus writes data to the IC card in the temporary wireless communication mode, and
   the information processing terminal issues the inactivate command to return the IC card to the wired communication mode to read the data written in the IC card in response to completion of writing the data to the IC card.

3. A three-way data transfer system according to claim 1, wherein, for data transfer from the information processing terminal to the external card reading and writing apparatus via the IC card when the IC card is in the wired communication mode,
   the information processing terminal writes data to the IC card, and then issues the activate command to temporarily switch the IC card to the wireless communication mode,
   the external card reading and writing apparatus reads the data from the IC card in the temporary wireless communication mode, and
   the information processing terminal issues the inactivate command to return the IC card to the wired communication mode in response to completion of reading the data from the IC card.

4. A three-way data transfer system according to claim 1, wherein, for data transfer from the external card reading and writing apparatus to the information processing terminal via the IC card when the IC card is in the wireless communication mode,
   the external card reading and writing apparatus writes data to the IC card, and then issues the second activate command to temporarily switch the IC card to the wired communication mode,
   the information processing terminal reads the data from the IC card in the temporary wired communication mode, and
   the external card reading and writing apparatus issues the second inactivate command to return the IC card to the wireless communication mode in response to completion of reading the data from the IC card.

5. A three-way data transfer system according to claim 1, wherein, for data transfer from the information processing terminal to the external card reading and writing apparatus via the IC card when the IC card is in the wireless communication mode,
   the external card reading and writing apparatus issues the second activate command to temporarily switch the IC card to the wired communication mode,
   the information processing terminal writes the data to the IC card in the temporary wired communication mode, and
   the external card reading and writing apparatus issues the second inactivate command to return the IC card to the wireless communication mode to read the data written in the IC card in response to completion of writing the data to the IC card.

6. A three-way data transfer method, in which an IC module into which an IC card function unit and a card reading and writing apparatus function unit are integrated intermediates, of transferring data between an external card reading and writing apparatus connected to the IC card function unit via a wireless communication interface and an information terminal connected to the IC module via a wired communication interface,
   wherein the IC card operates in a wired communication mode in which the card reading and writing apparatus function unit is initiated in response to activation of an internal power supply to transact with the information processing terminal, and operates in a wireless communication mode in which the IC card function unit is initiated in response to detection of a carrier wave from the external card reading and writing apparatus to transact with the external card reading and writing apparatus, the three-way data transfer method comprising:

a step of causing the IC card, which is in the wired communication mode, to be temporarily switched to the wireless communication mode by an activate command;

a step of causing the IC card to be returned to the wired communication mode by an inactivate command;

a step of causing the IC card, which is in the wireless communication mode, to be temporarily switched to the wired communication mode by a second activate command from the external card reading and writing apparatus; and a step of causing the IC card to be returned to the wireless communication mode by a second inactivate command.

7. A three-way data transfer method according to claim 6, further comprising:

for data transfer from the external card reading and writing apparatus to the information processing terminal via the IC card when the IC card is in the wired communication mode, a step of causing the information processing terminal to issue the activate command to temporarily switch the IC card to the wireless communication mode;

a step of causing the external card reading and writing apparatus to write data to the IC card in the temporary wireless communication mode; and a step of causing the information processing terminal to issue the inactivate command to return the IC card to the wired communication mode to read the data written in the IC card in response to completion of writing the data to the IC card.

8. A three-way data transfer system according to claim 6, further comprising:

for data transfer from the information processing terminal to the external card reading and writing apparatus via the IC card when the IC card is in the wired communication mode, a step of causing the information processing terminal to write data to the IC card and then issue the activate command to temporarily switch the IC card to the wireless communication mode;

a step of causing the external card reading and writing apparatus to read the data from the IC card in the temporary wireless communication mode; and a step of causing the information processing terminal to issue the inactivate command to return the IC card to the wired communication mode in response to completion of reading the data from the IC card.

9. A three-way data transfer method according to claim 6, further comprising:

for data transfer from the external card reading and writing apparatus to the information processing terminal via the IC card when the IC card is in the wireless communication mode, a step of causing the external card reading and writing apparatus to write data to the IC card and then issue the second activate command to temporarily switch the IC card to the wired communication mode;

a step of causing the information processing terminal to read the data from the IC card in the temporary wired communication mode; and a step of causing the external card reading and writing apparatus to issue the second inactivate command to return the IC card to the wireless communication mode in response to completion of reading the data from the IC card.

10. A three-way data transfer method according to claim 6, further comprising:

for data transfer from the information processing terminal to the external card reading and writing apparatus via the IC card when the IC card is in the wireless communication mode, a step of causing the external card reading and writing apparatus to issue the second activate command to temporarily switch the IC card to the wired communication mode;

a step of causing the information processing terminal to write data to the IC card in the temporary wired communication mode; and a step of causing the external card reading and writing apparatus to issue the second inactivate command to return the IC card to the wireless communication mode to read the data written in the IC card in response to completion of writing the data to the IC card.

11. A three-way data communication system comprising an external reader/writer, a program control unit in an information processing terminal, and an IC chip included in the information processing terminal, said IC chip including a wireless communication interface for communicating with the external reader/writer, a wired communication interface for connecting to the program control unit, and a memory for storing data, wherein the IC chip is adapted to operate in a wireless communication mode to make transactions through the wireless communication interface in response to detection of a carrier wave from the external reader/writer, and to operate in a wired communication mode to make transactions through the wired communication interface in response to activation of an internal power supply;

the program control unit is adapted to issue a first activate command for switching from the wired communication mode to the wireless communication mode temporarily, and to issue a first inactivate command for returning from the temporarily-activated wireless communication mode to the wired communication mode;

the external reader writer is adapted to issue a second activate command for switching from the wireless communication mode to the wired communication mode temporarily, and to issue a second inactivate command for returning from the temporarily-activated wired communication mode to the wireless communication mode; and the IC chip is adapted to notify the information processing terminal of a) a termination of a transaction in the wireless communication mode previously initiated by receipt of the first activate command, b) a return of the transaction to the wired communication mode according to receipt of the first inactivate command, c) an initiation of the transaction in the wired communication mode according to receipt of the second activate command, and d) a return of the transaction to the wireless communication mode according to receipt of the second inactivate command.

12. The three-way data communication system according to claim 11, wherein the IC chip is adapted to conduct the notification in cases a) and c) by an output of a signal indicative of completion of wireless communication.

13. The three-way data communication system according to claim 11, wherein said IC chip has an IC card function data-communicating with the external reader/writer and a reader/writer function of data-communicating with an external IC card.

14. An information processing terminal which is equipped with an IC chip including a program control unit, a power supply, and an IC card unit having a wireless communication interface for communicating with an external reader/writer, and a wired communication interface for connecting to the program control unit, wherein said IC card unit operates in a wireless communication mode to make transactions through the wireless communication interface in response to detection of a carrier wave from the external reader/writer, and operates in a wired communication mode to make transactions through the wired communication interface in response to activation of an internal power supply;

the program control unit issues a first activate command for switching from the wired communication mode to the wireless communication mode temporarily, and issues a first inactivate command for returning from the temporarily-activated wireless communication mode to the wired communication mode; and the IC chip detects a) a termination of a transaction in the wireless communication mode previously initiated according to receipt of the first activate command, b) a return of the transaction to the wired communication mode according to receipt of the first inactivate command, c) an initiation of the transaction in the wired communication mode according to receipt of a second activate command, and d) a return of the transaction to the wireless communication mode according to receipt of a second inactivate command.

15. The information processing terminal according to claim 14, wherein the IC chip is adapted to conduct the notification in cases a) and c) by output of a signal indicative of completion of wireless communication.

16. The information processing terminal according to claim 14, wherein said IC card unit has a reader/writer function of data-communicating with an external IC card in addition to an IC card function data-communicating with the external reader/writer.

17. The information processing terminal according to claim 14, wherein said IC card unit receives a push command for sending data to the memory from the external reader/writer, and a pull command for receiving data stored in the memory.

18. The information processing terminal according to claim 14, wherein said program control unit issues a push command for sending data to the memory, and issues a pull command for receiving data stored in the memory.

19. The information processing terminal according to claim 14, wherein said IC card unit is configured to as an IC chip or an IC chip and an antenna connected to this IC chip.

20. An IC chip for the information processing apparatus claimed in claim 14.

21. A three-way data communication method for transferring data between an external reader/writer and a controller included in an information processing terminal through an IC card unit in the information processing unit, said IC card unit including a wireless communication interface for communicating with the external reader/writer, a wired communication interface for connecting to the controller, and a memory for storing data, wherein the IC card unit operates in a wired communication mode which is activated by turning on an internal power supply to make transactions with the controller, and operates a wireless communication mode which is activated by detection of a carrier wave to make transactions with the external reader/writer, the three-way data transfer method comprising:

issuing, by the controller, an activate command for switching from the wired communication mode to the wireless communication mode temporarily;

conducting a wireless communication between the external reader/writer and the IC card unit;

notifying the controller after a completion of the wireless communication to accommodate a switch from the wireless communication mode to the wired communication mode; and issuing an inactive command for returning the temporarily-activated wireless communication mode to the wired communication mode.

22. The three-way data communication method according to claim 21, further comprising:

writing data in the memory of the IC card unit by the external reader/writer under the temporarily-activated wireless communication mode; and reading data written in the memory by the controller under the wired communication mode.

23. The three-way data communication method according to claim 21, further comprising steps of:

sending data to the memory of the IC card unit by the controller; and reading data stored in the memory by the external reader/writer under the temporarily-activated wireless communication mode.

* * * * *

UNITED STATES PATENT AND TRADEMARK OFFICE
CERTIFICATE OF CORRECTION

| | | |
|---|---|---|
| PATENT NO. | : 7,188,777 B2 | Page 1 of 1 |
| APPLICATION NO. | : 10/433790 | |
| DATED | : March 13, 2007 | |
| INVENTOR(S) | : Akihiko Yamagata et al. | |

It is certified that error appears in the above-identified patent and that said Letters Patent is hereby corrected as shown below:

Title Page:
Item (54) and Col. 1, Lines 1-3 should be read as follows:
-- IC CARD, INFORMATION PROCESSING TERMINAL, AND THREE-WAY DATA COMMUNICATION SYSTEM AND METHOD --.

Signed and Sealed this

Thirty-first Day of July, 2007

JON W. DUDAS
*Director of the United States Patent and Trademark Office*